(12) United States Patent
Ohira et al.

(10) Patent No.: US 8,999,576 B2
(45) Date of Patent: Apr. 7, 2015

(54) CATHODE ACTIVE MATERIAL, CATHODE AND NONAQUEOUS SECONDARY BATTERY

(75) Inventors: Koji Ohira, Osaka (JP); Motoaki Nishijima, Osaka (JP); Toshitsugu Sueki, Osaka (JP); Shogo Esaki, Osaka (JP); Isao Tanaka, Kyoto (JP); Yukinori Koyama, Kyoto (JP); Katsuhisa Tanaka, Kyoto (JP); Koji Fujita, Kyoto (JP); Shunsuke Murai, Kyoto (JP)

(73) Assignee: Sharp Kabushiki kaisha, Osaka (JP)

( * ) Notice: Subject to any disclaimer, the term of this patent is extended or adjusted under 35 U.S.C. 154(b) by 523 days.

(21) Appl. No.: 13/321,717

(22) PCT Filed: May 20, 2010

(86) PCT No.: PCT/JP2010/058559
§ 371 (c)(1),
(2), (4) Date: Nov. 21, 2011

(87) PCT Pub. No.: WO2010/134579
PCT Pub. Date: Nov. 25, 2010

(65) Prior Publication Data
US 2012/0070708 A1    Mar. 22, 2012

(30) Foreign Application Priority Data

May 22, 2009   (JP) .................. 2009-124647

(51) Int. Cl.
*H01M 4/134*   (2010.01)
*H01M 4/58*    (2010.01)
(Continued)

(52) U.S. Cl.
CPC ............ *H01M 4/5825* (2013.01); *H01M 4/136* (2013.01); *H01M 10/052* (2013.01); *Y02E 60/122* (2013.01)

(58) Field of Classification Search
USPC .................. 429/213, 221, 218.1, 231.95
See application file for complete search history.

(56) References Cited

U.S. PATENT DOCUMENTS 6,528,033 B1   3/2003  Barker et al.
6,815,122 B2   11/2004 Barker et al.
(Continued)

FOREIGN PATENT DOCUMENTS

CA   2 271 354 A1   11/2000
CN   1837033 A      9/2006
(Continued)

OTHER PUBLICATIONS

Wang et al. Journal of Power Sources 159 (2006) 282-286.*
(Continued)

*Primary Examiner* — Stewart Fraser
*Assistant Examiner* — Olatunji Godo
(74) *Attorney, Agent, or Firm* — Nixon & Vanderhye P.C.

(57) ABSTRACT

A cathode active material of the present invention is a cathode active material having a composition represented by General Formula (1) below, $$LiFe_{1-x}M_xP_{1-y}Si_yO_4 \quad (1),$$

where: an average valence of Fe is +2 or more; M is an element having a valence of +2 or more and is at least one type of element selected from the group consisting of Zr, Sn, Y, and Al; the valence of M is different from the average valence of Fe; $0<x\leq0.5$; and $y=x\times(\{valence\ of\ M\}-2)+(1-x)\times(\{average\ valence\ of\ Fe\}-2)$. This provides a cathode active material that not only excels in terms of safety and cost but also can provide a long-life battery.

18 Claims, 11 Drawing Sheets

(51) Int. Cl.
*H01M 4/136* (2010.01)
*H01M 10/052* (2010.01)

(56) References Cited

U.S. PATENT DOCUMENTS

| | | |
|---|---|---|
| 2001/0055718 A1 | 12/2001 | Li et al. |
| 2002/0195591 A1 | 12/2002 | Ravet et al. |
| 2003/0054253 A1 | 3/2003 | Morishima et al. |
| 2003/0170542 A1* | 9/2003 | Barker et al. ............. 429/231.9 |
| 2003/0190527 A1 | 10/2003 | Pugh et al. |
| 2003/0215715 A1 | 11/2003 | Barker et al. |
| 2004/0086445 A1 | 5/2004 | Armand et al. |
| 2004/0214084 A1 | 10/2004 | Barker et al. |
| 2005/0058905 A1 | 3/2005 | Barker et al. |
| 2005/0181283 A1 | 8/2005 | Pugh et al. |
| 2006/0014079 A1 | 1/2006 | Chang et al. |
| 2006/0246351 A1 | 11/2006 | Barker et al. |
| 2006/0292444 A1* | 12/2006 | Chiang et al. ............. 429/218.1 |
| 2008/0261113 A1* | 10/2008 | Huang et al. ................ 429/221 |
| 2010/0124703 A1 | 5/2010 | Ohira et al. |
| 2010/0140540 A1* | 6/2010 | Yamada et al. ............. 252/182.1 |
| 2012/0070708 A1 | 3/2012 | Ohira et al. |
| 2013/0209886 A1* | 8/2013 | Ohira et al. .................. 429/224 |

FOREIGN PATENT DOCUMENTS

| | | |
|---|---|---|
| CN | 101339994 A | 1/2009 |
| DE | 600 13 909 T2 | 9/2005 |
| DE | 600 37 609 T2 | 1/2009 |
| JP | 2001-307726 | 11/2001 |
| JP | 2001-307731 A | 11/2001 |
| JP | 2002-198050 | 7/2002 |
| JP | 2004-178835 | 6/2004 |
| JP | 2005-519451 | 6/2005 |
| JP | 2005-522009 | 7/2005 |
| JP | 2008-506243 | 2/2008 |
| JP | 2009-104794 | 5/2009 |
| JP | 2009-170401 | 7/2009 |
| JP | 2010-123341 A | 6/2010 |
| JP | 2011-77030 A | 4/2011 |
| WO | 97/40541 A1 | 10/1997 |
| WO | WO 2008/039170 | 4/2008 |
| WO | WO 2008/123311 * | 10/2008 |
| WO | 2010/134579 A1 | 11/2010 |

OTHER PUBLICATIONS

Tian et al. Journal of Rare Earths, vol. 26, No. 2, Apr. 2008, p. 279.*
Recham et al. Chem. Mater. 2008, 20, 6798-6809.*
International Search Report for PCT/JP2010/058559 mailed Aug. 10, 2010.
International Search Report for PCT/JP2011/064694, mailed Sep. 20, 2011.
Office Action mailed Mar. 14, 2014 in U.S. Appl. No. 13/807,967.
Office Action dated Oct. 23, 2014, U.S. Appl. No. 13/427,416.
Office Action mailed Aug. 7, 2014 in U.S. Appl. No. 13/807,967.

* cited by examiner

CATHODE ACTIVE MATERIAL, CATHODE AND NONAQUEOUS SECONDARY BATTERY

This application is the U.S. national phase of International Application No. PCT/JP2010/058559 filed 20 May 2010 which designated the U.S. and claims priority to JP 2009-124647 filed 22 May 2009, the entire contents of each of which are hereby incorporated by reference.

TECHNICAL FIELD

The present invention relates to a cathode active material, a cathode in which such a cathode active material is used, and a nonaqueous secondary battery (lithium secondary battery) in which such a cathode is used. More specifically, the present invention relates to a nonaqueous secondary battery excellent in cycling characteristics.

BACKGROUND ART

Lithium secondary batteries have been in practical and widespread use as secondary batteries for portable electronic devices Furthermore, in recent years, lithium secondary batteries have drawn attention not only as small-sized secondary batteries for portable electronic devices but also as high-capacity devices for use in vehicles, power storage, etc. Therefore, there has been a growing demand for higher safety standards, lower costs, longer lives, etc.

A lithium secondary battery is composed mainly of a cathode, an anode, an electrolyte, a separator, and an armoring material. Further, the cathode is constituted by a cathode active material, a conductive material, a current collector, and a binder (binding agent).

In general, the cathode active material is realized by a layered transition metal oxide such as $LiCoO_2$. However, in a state of full charge, such layered transition metal oxides are prone to cause oxygen desorption at a comparatively low temperature of approximately 150° C., and such oxygen desorption may cause a thermal runaway reaction in the battery. Therefore, when a battery having such a cathode active material is used for a portable electronic device, there is a risk of an accident such as heating, firing, etc. of the battery.

For this reason, in terms of safety, expectations have been placed on lithium manganate ($LiMn_2O_4$) having a spinel-type structure, lithium iron phosphate ($LiFePO_4$) having an olivine-type structure, etc. that are stable in structure and do not emit oxygen in abnormal times.

Further, in terms of cost, cobalt (Co) is low in degree of existence in the earth's crust and high in price. For this reason, expectations have been placed on lithium nickel oxide ($LiNiO_2$) or a solid solution thereof ($Li(Co_{1-x}Ni_x)O_2$), lithium manganate ($LiMn_2O_4$), lithium iron phosphate ($LiFePO_4$), etc.

Further, in terms of life, the insertion and desorption of Li into and from a cathode active material along with charging and discharging cause structural destruction in the cathode active material. For this reason, more expectations have been placed on lithium manganate ($LiMn_2O_4$) having a spinel-type structure, lithium iron phosphate ($LiFePO_4$) having an olivine-type structure, etc. than on layered transition metal oxides because of their structural stability.

Therefore, for example, such lithium iron phosphate having an olivine-type structure has drawn attention as a cathode active material for a battery in consideration of safety, cost, and life. However, when lithium iron phosphate having an olivine-type structure is used as a cathode active material for a battery, there are such declines in charge-discharge behavior as insufficient electron conductivity and low average potential.

In order to improve charge-discharge behavior, there has been proposed an active material represented by general formula $A_aM_b(XY_4)_cZ_d$ (where A is an alkali metal, M is a transition metal, $XY_4$ is $PO_4$ or the like, and 7 is OH or the like) (e.g., see Patent Literature 1).

Further, there have been also proposed an active material, represented by general formula $LiMP_{1-x}A_xO_4$ (where M is a transition metal, A is an element having an oxidation number of +4 or less, and 0<X<1), whose P site has been replaced by the element A (e.g., see Patent Literature 2).

Further proposed as a cathode active material for a non-aqueous electrolyte secondary battery excellent in large-current charge-discharge behavior is a material represented by general formula $Li_{1-x}A_xFe_{1-y-z}M_yMe_zP_{1-m}X_mO_{4-n}Z_n$ (where A is Na or K; M is a metal element other than Fe, Li, and Al; X is Si, N, or As; Z is F, Cl, Br, I, S, or N) (e.g., see Patent Literature 3). Further proposed as an electrode active material that can be economically produced, is satisfactory in charging capacity, and is satisfactory in rechargeability over many cycles is a material represented by general formula $A_{a+x}M_bP_{1-x}Si_xO_4$ (where A is Ki or Na, or K; and M is a metal) (e.g., see Patent Literature 4).

There has also been disclosed lithium transition metal phosphorus, such as $LiFePO_4$, which includes at least two coexisting phases including a lithium-rich transition metal phosphate phase and a lithium-poor transition metal phosphate phase, the coexisting phases being different from each other in molar volume by approximately 5.69 (e.g., see Table 2 of Patent Literature 5).

CITATION LIST

Patent Literature 1

Japanese Patent Application Publication (Translation of PCT Application), Tokuhyou, No. 2005-522009 (Publication Date: Jul. 21, 2005)

Patent Literature 2

Japanese Patent Application Publication (Translation of PCT Application), Tokuhyou, No. 2008-506243 (Publication Date: Feb. 28, 2008)

Patent Literature 3

Japanese Patent Application Publication, Tokukai, No. 2002-198050 A (Publication Date: Jul. 12, 2002)

Patent Literature 4

Japanese Patent Application Publication (Translation of PCT Application), Tokuhyou, No. 2005-519451 (Publication Date: Jun. 30, 2005)

Patent Literature 5

PCT International Publication No. 2008/039170, pamphlet (Publication Date: Apr. 3, 2008)

SUMMARY OF INVENTION

Technical Problem

Unfortunately, however, the active materials structured as described in Patent Literatures 1 to 5 above result in short-life batteries.

Specifically, according to the structures of the active materials as described in Patent Literatures 1 to 5, the insertion and desorption of Li into and from a cathode active material along with charging and discharging cause great expansion or contraction in the cathode active material; therefore, an increase in the number of cycles may cause the cathode active material to gradually detach from the current collector and the conductive material physically and therefore cause structural destruction in the cathode active material. This is because a material that greatly expands or contracts due to charging and discharging causes destruction of secondary particles and destruction of the conductive path between the cathode active material and the conductive material and therefore causes an increase in internal resistance of the battery. This results in an increase in active materials that do not contribute to charging or discharging, causes a decrease in capacity, and therefore makes the battery short lived.

As mentioned above, there has been a demand for cathode active materials excellent in terms of safety, cost, and life. However, the active materials structured as described in Patent Literatures 1 and 2 above are high in rate of expansion and contraction in volume (rate of change in volume) during charging and discharging and therefore result in short lives.

The present invention has been made in view of the foregoing problems, and it is an object of the present invention to realize a cathode active material that not only excels in terms of safety and cost but also can provide a long-life battery, a cathode in which such a cathode active material is used, and a nonaqueous secondary battery in which such a cathode is used.

Solution to Problem

The present invention extends the life of a battery through suppression of expansion and contraction by carrying out element substitution with use of lithium iron phosphate as a basic structure.

Specifically, in order to solve the above problems, a cathode active material of the present invention is a cathode active material having a composition represented by General Formula (1) below, $$LiFe_{1-x}M_xP_{1-y}Si_yO_4 \qquad (1),$$

where: an average valence of Fe is +2 or more; M is an element having a valence of +2 or more and is at least one type of element selected from the group consisting of Zr, Sn, Y, and Al; the valence of M is different from the average valence of Fe; $0 < x \leq 0.5$; and $y = x \times (\{valence\ of\ M\} - 2) + (1-x) \times (\{average\ valence\ of\ Fe\} - 2)$.

According to the foregoing structure, a change in volume during Li insertion and desorption can be suppressed by replacing at least part of P site with Si and replacing part of Fe site with an element capable of compensation for charges in the crystal structure. As a result, in the case of a battery made with use of such a cathode active material, the cathode can be prevented from expanding or contracting due to charging and discharging. This brings about an effect of providing a cathode active material that not only excels in terms of safety and cost but also can provide a long-life battery.

Furthermore, Zr, Sn, Y, and Al are easily combined because they do not change in valence, can be combined in a reducing atmosphere, and do not require control of the partial pressure of oxygen for controlling the valence of a substituting element.

In order to solve the foregoing problems, a cathode of the present invention includes: the cathode active material of the present invention; a conductive material; and a binder.

According to the foregoing structure, the inclusion of such a cathode active material according to the present invention brings about an effect of providing a cathode that not only excels in terms of safety and cost but also can provide a long-life battery.

In order to solve the foregoing problems, a nonaqueous secondary battery of the present invention includes: the cathode of the present invention; an anode; an electrolyte; and a separator.

According to the foregoing structure, the inclusion of such a cathode according to the present invention brings about an effect of providing a long-life battery excellent in terms of safety and cost.

A module of the present invention includes a combination of a plurality of the nonaqueous secondary battery of the present invention.

According to the foregoing structure, the inclusion of such a nonaqueous secondary battery according to the present invention brings about an effect of providing a long-life module excellent in terms of safety and cost.

A power storage system of the present invention includes the nonaqueous secondary battery of the present invention.

According to the foregoing structure, the inclusion of such a nonaqueous secondary battery according to the present invention brings about an effect of providing a long-life power storage system excellent in terms of safety and cost.

Advantageous Effects of Invention

As described above, a cathode active material of the present invention has a composition represented by General Formula (1) above.

This brings about an effect of providing a cathode active material that not only excels in terms of safety and cost but also can provide a long-life battery.

As described above, a cathode of the present invention includes: the cathode active material of the present invention; a conductive material; and a binder.

This brings about an effect of providing a cathode that not only excels in terms of safety and cost but also can provide a long-life battery.

As described above, a nonaqueous secondary battery of the present invention includes: the cathode of the present invention; an anode; an electrolyte; and a separator.

This brings about an effect of providing a long-life battery excellent in terms of safety and cost.

A module of the present invention includes a combination of a plurality of the nonaqueous secondary battery of the present invention.

This brings about an effect of providing a long-life module excellent in terms of safety and cost.

A power storage system of the present invention includes the nonaqueous secondary battery of the present invention.

This brings about an effect of providing a long-life power storage system excellent in terms of safety and cost.

DESCRIPTION OF EMBODIMENTS

Figure 1:
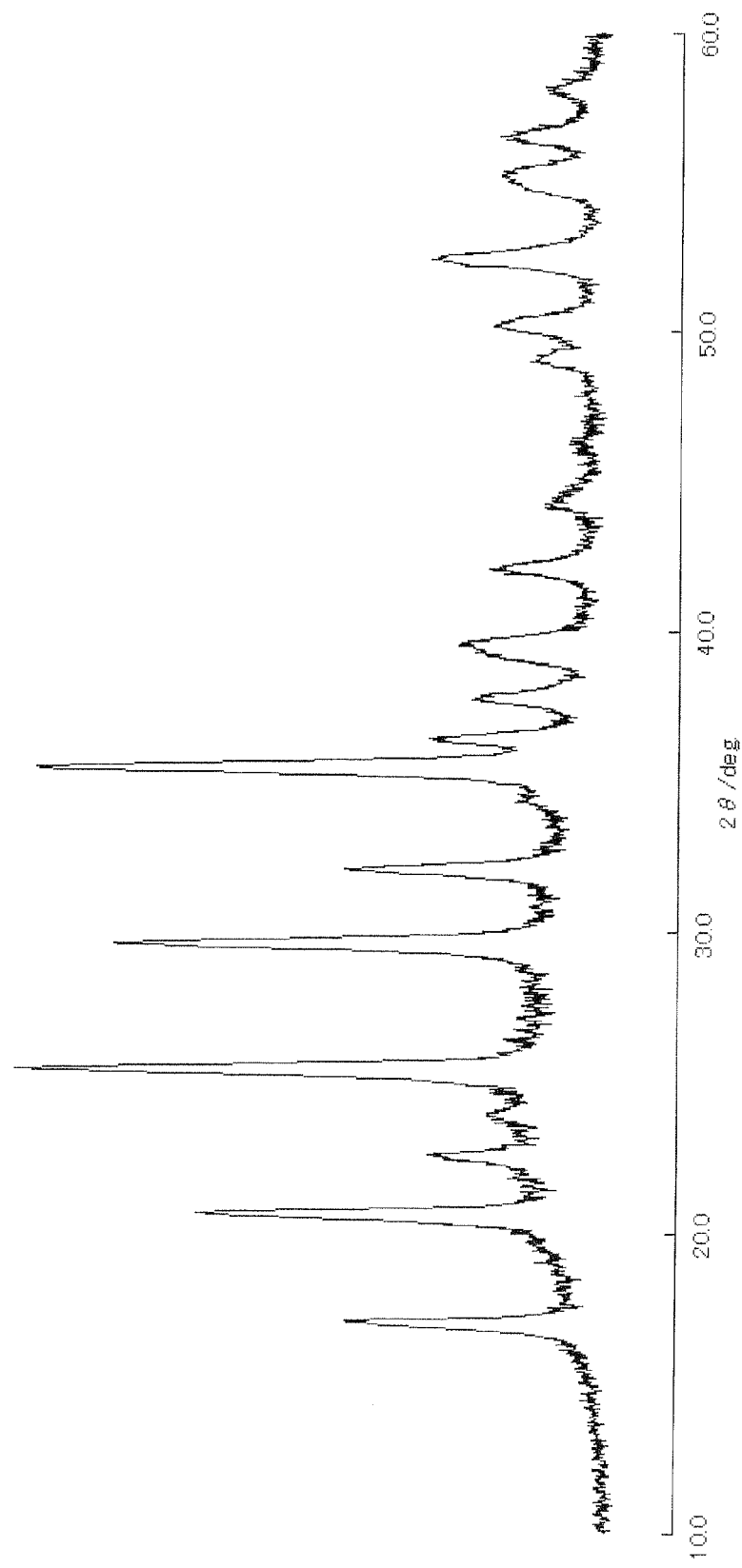
FIG. 1 is a graph illustrating an X-ray diffraction pattern for a cathode active material prepared in Example 2.
Figure 2:
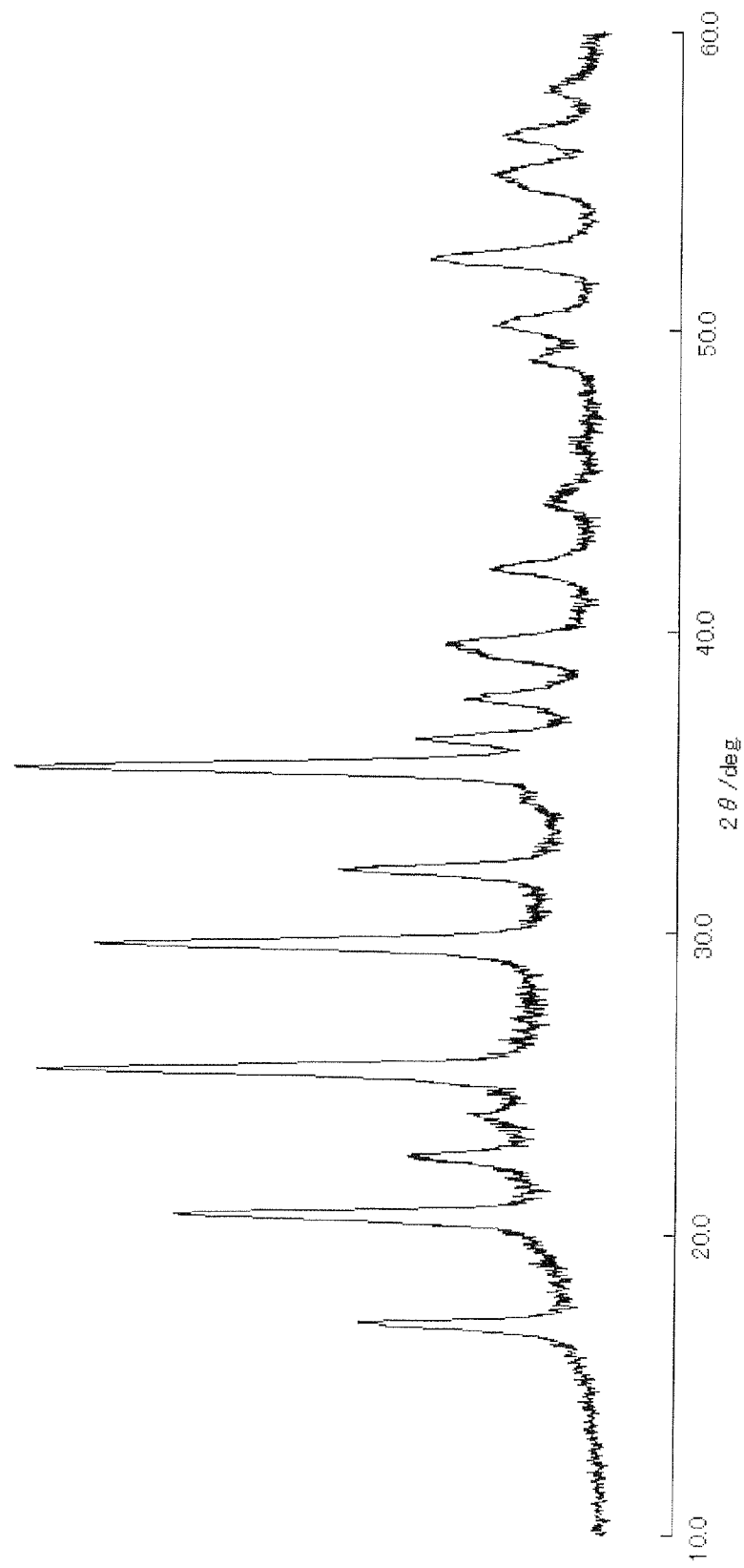
FIG. 2 is a graph illustrating an X-ray diffraction pattern for a cathode active material prepared in Example 3.
Figure 3:
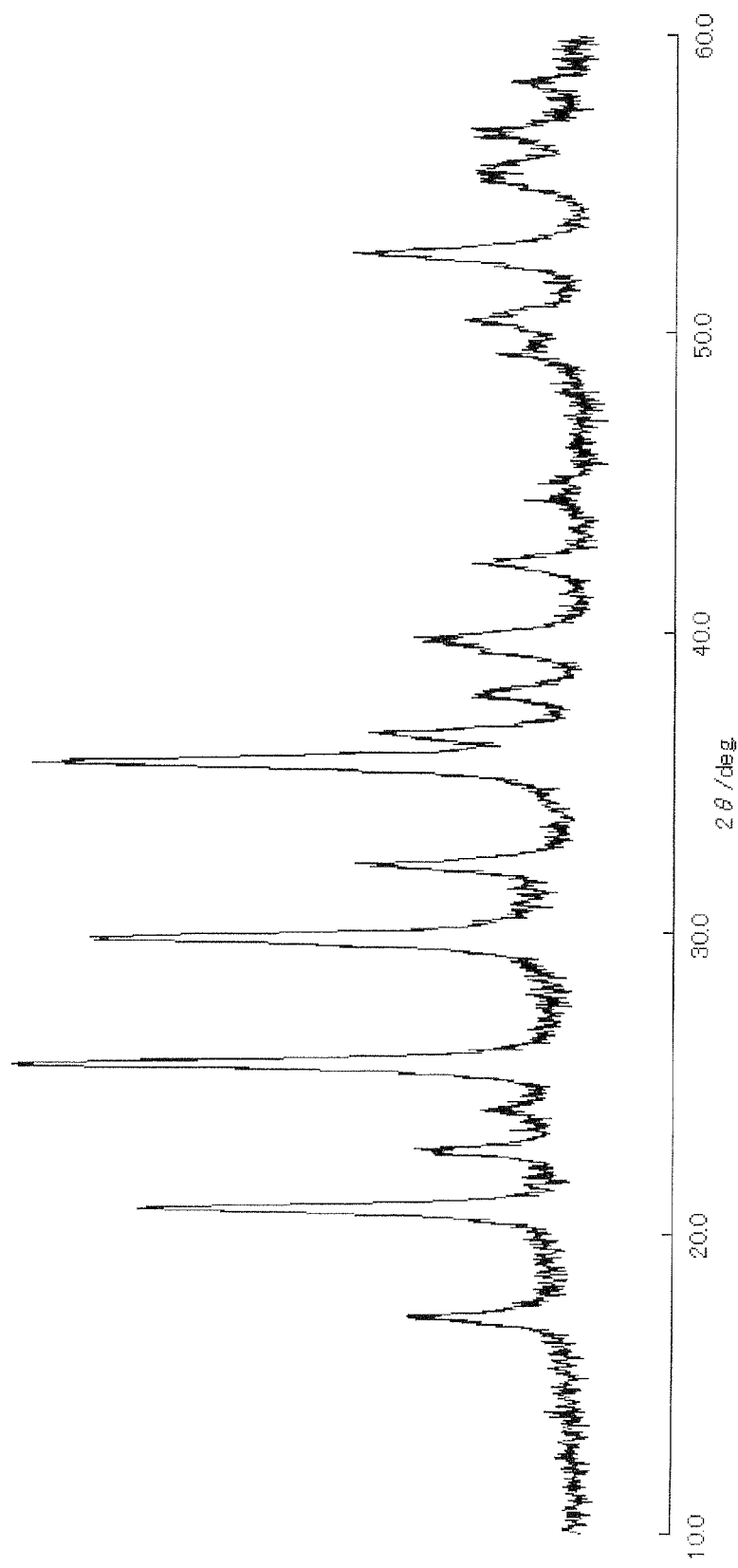
FIG. 3 is a graph illustrating an X-ray diffraction pattern for a cathode active material prepared in Example 4.
Figure 4:
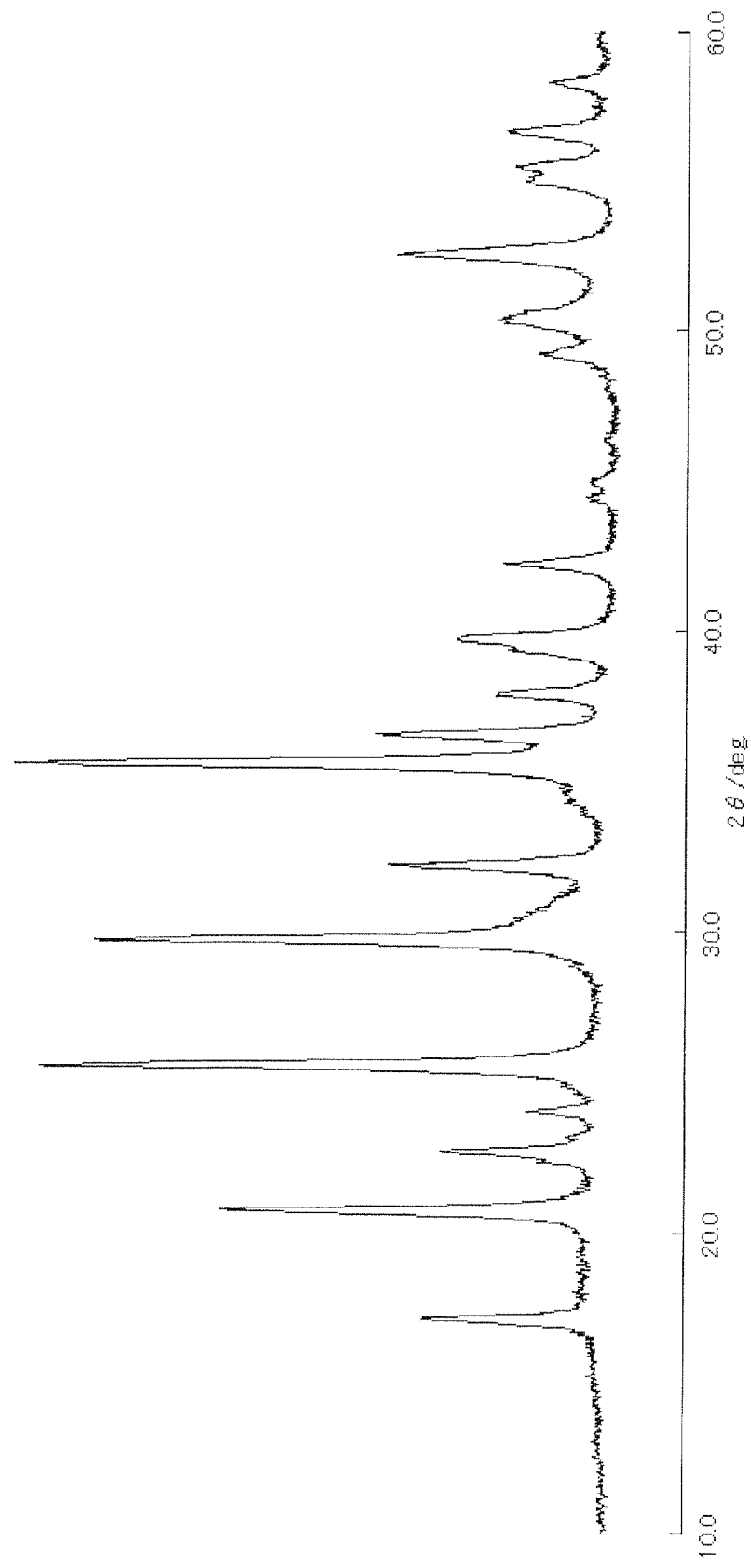
FIG. 4 is a graph illustrating an X-ray diffraction pattern for a cathode active material prepared in Example 5.
Figure 5:
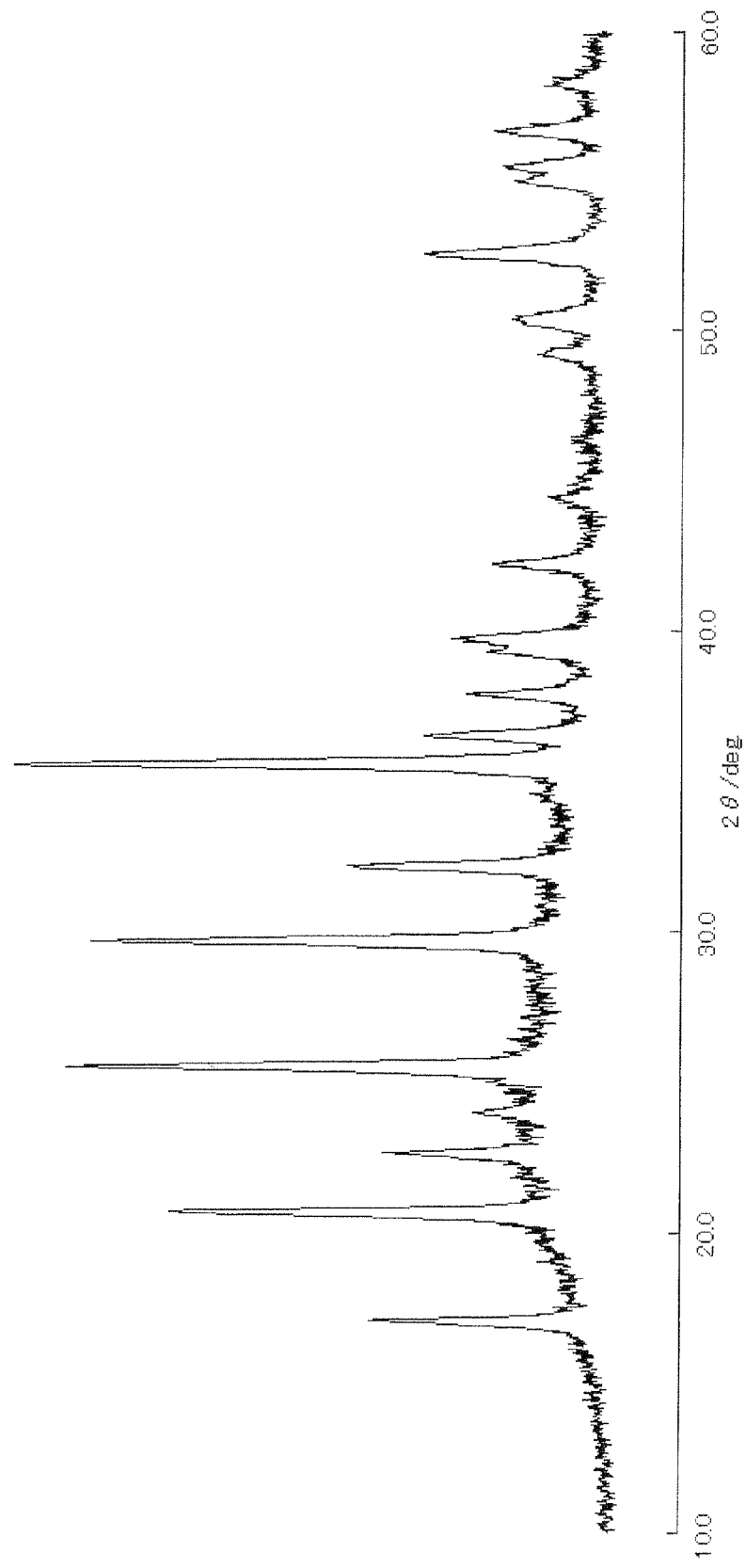
FIG. 5 is a graph illustrating an X-ray diffraction pattern for a cathode active material prepared in Example 6.
Figure 6:
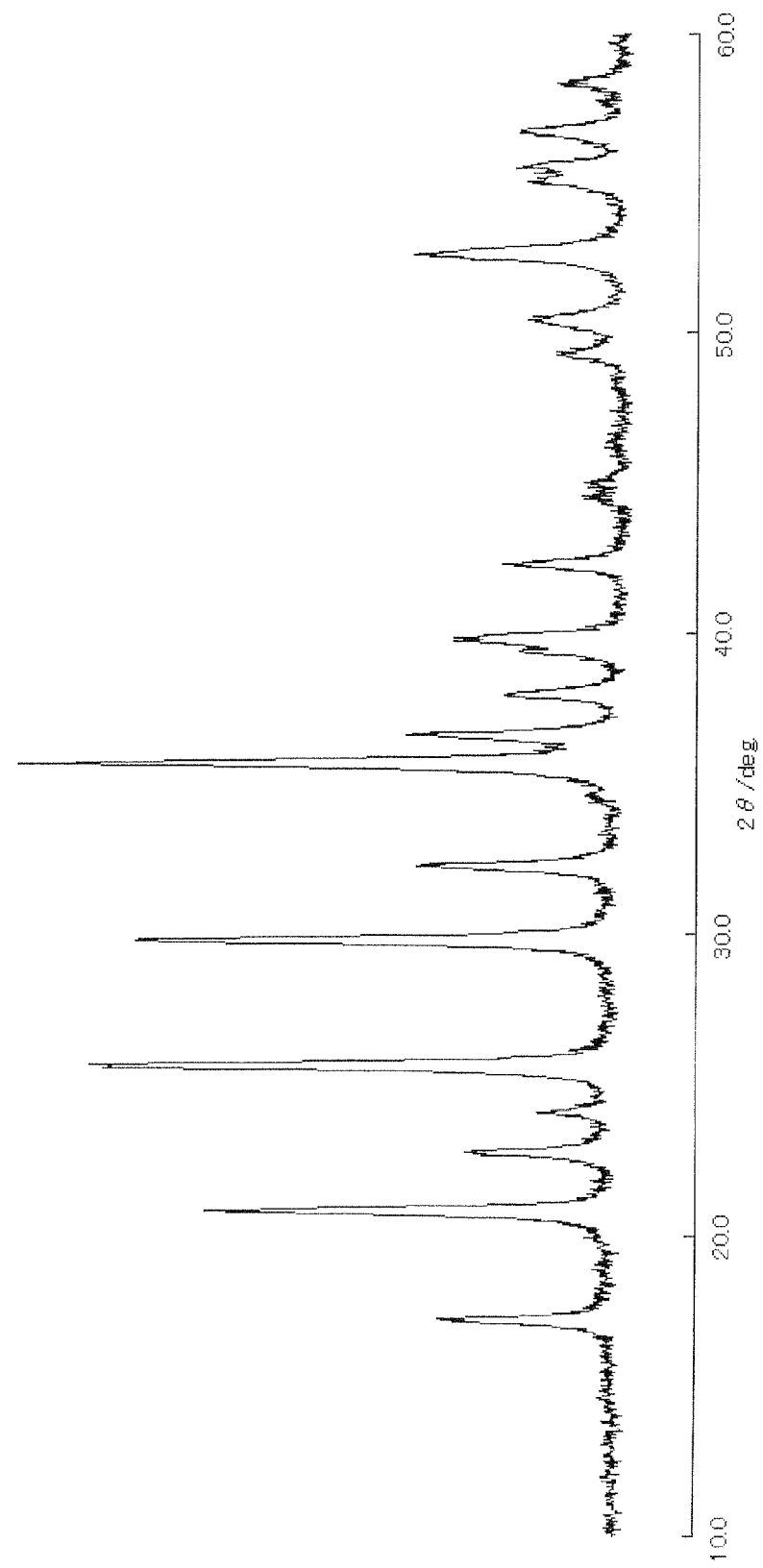
FIG. 6 is a graph illustrating an X-ray diffraction pattern for a cathode active material prepared in Example 7.
Figure 7:
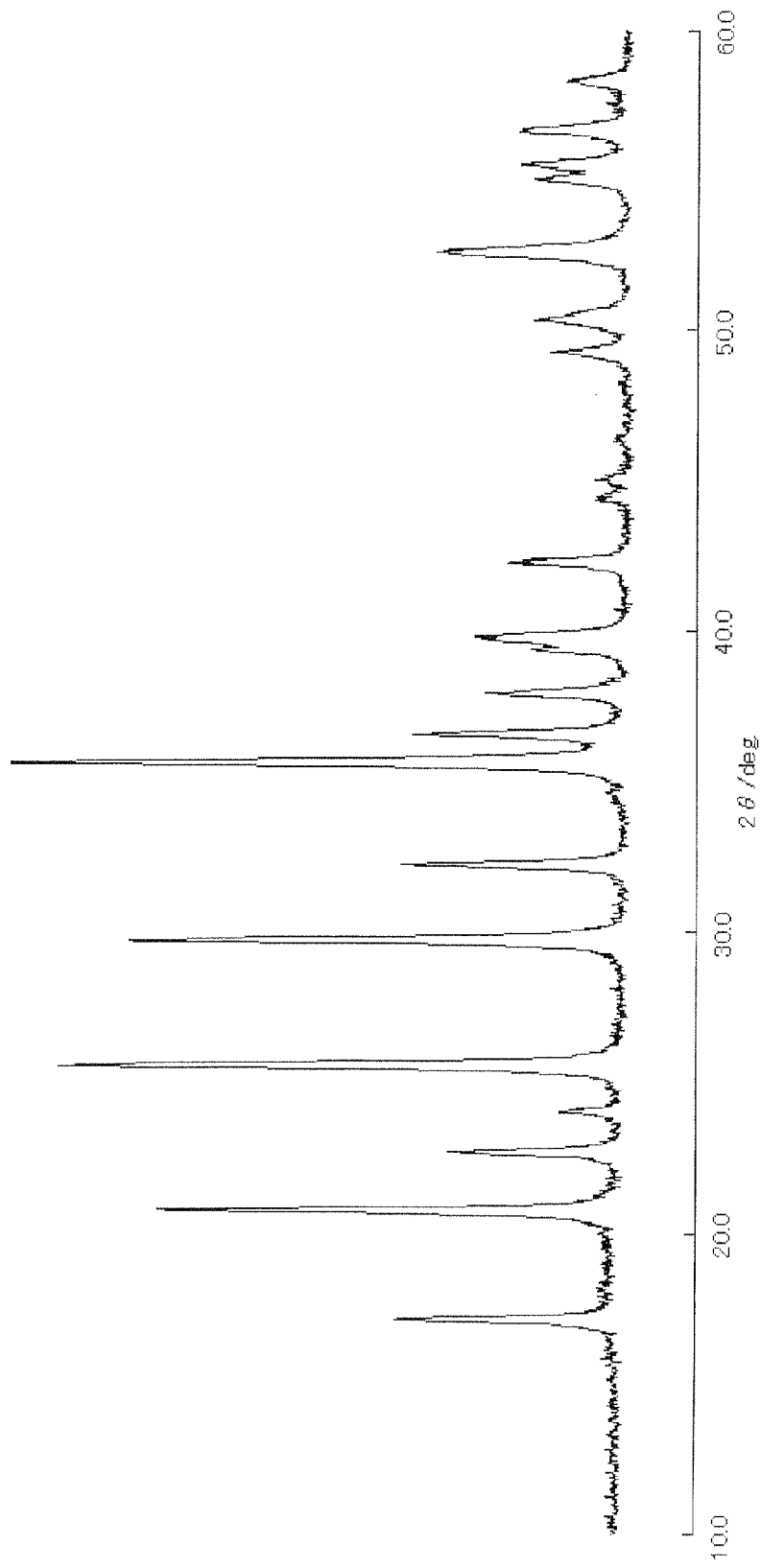
FIG. 7 is a graph illustrating an X-ray diffraction pattern for a cathode active material prepared in Comparative Example 1.

The present invention is described below in detail. It should be noted, in this specification, that the range "A to B" means "A or more to B or less". Further, the various properties enumerated in this specification mean values measured by methods described later in Examples, unless otherwise noted.

(I) Cathode Active Material

A cathode active material of the present embodiment is a cathode active material having a composition represented by General Formula (1) below,

$$LiFe_{1-x}M_xP_{1-y}Si_yO_4 \quad (1),$$

where: an average valence of Fe is +2 or more; M is an element having a valence of +2 or more and is at least one type of element selected from the group consisting of Zr, Sn, Y, and Al; the valence of M is different from the average valence of Fe; $0<x\leq0.5$; and $y=x\times(\{valence\ of\ M\}-2)+(1-x)\times(\{average\ valence\ of\ Fe\}-2)$.

The term "average valence of Fe" here means the average of the valences of all the Fe atoms constituting the cathode active material.

In general, in the case of olivine-type lithium iron phosphate, there is a contraction in volume during desorption of Li from the initial structure due to charging. During this structural change, there are contractions along the a axis and the b axis, and there is an expansion along the c axis. For this reason, the inventors found it possible to suppress a change in volume by reducing the rates of contraction along the a axis and the b axis and increasing the rate of expansion along the c axis through any sort of substitution.

Then, the inventors found that by replacing part of P site with Si and replacing part of Fe site with another atom, compensation for charges in the crystal structure is made and a change in volume during Li desorption is suppressed, whereby expansion and contraction due to charging and discharging are also suppressed.

It should be noted that although most of the materials that have compositions represented by general formula (1) have olivine-type structures, the scope of the present invention is not limited to those materials which have olivine-type structures. Those materials which do not have olivine-type structures are also encompassed in the scope of the present invention.

In the cathode active material according to the present embodiment, P site has been replaced by Si, and P and Si are different in valence from each other. Therefore, it is necessary to make compensation for charges in the crystal structure. For this reason, Fe site has been replaced by M.

That is, because the valences of P and Si in general formula (1) are +5 and +4, respectively, the substitution amount y of Si comes to satisfy $y=x\times(\{valence\ of\ M\}-2)+(1-x)\times(\{average\ valence\ of\ Fe\}-2)$ according to the principle that the total of charges in the structure is 0.

In General Formula (1), y preferably falls within the range $(x\times(\{valence\ of\ M\}-2))\leq y<(x\times(\{valence\ of\ M\}-2)+0.05)$.

Fe in general formula (1) can generally take on a valence of +2 or +3. $Fe^{2+}$ is preferably contained at a proportion of not less than 95% as calculated from a Mössbauer spectrum. More preferably, the average valence of Fe is +2, and particularly preferably, every Fe has a valence of +2.

In the present embodiment, the rate of change in volume of a unit cell in $Li_xFe_{1-x}M_xP_{1-y}Si_yO_4$ is preferably 5% or less, or more preferably 4% or less, relative to the volume of a unit cell in General Formula (1).

The reason why the rate of change in volume is preferably 4% or less is that the cathode active material according to the present embodiment has a change in slope of the volume maintenance ratio relative to the rate of change in volume at a point where the rate of change in volume (rate of expansion and contraction due to charging and discharging) of the volume of a unit cell reaches approximately 4%. That is, when the rate of change in volume becomes higher than approximately 4%, the volume maintenance ratio comes to decrease to a greater extent than the rate of change in volume increases. Therefore, if the rate of change in volume is approximately 4% or less, it is possible to better suppress a decrease in volume maintenance ratio.

The element M, which replaces Fe site, is an element capable of taking on a valence of +2 or more and at least one type of element selected from the group consisting of Zr, Sn, Y, and Al. Further, it is preferable that the element M, which replaces Fe site, be an element having a valence of +3 or +4. For a greater effect of suppressing the rate of change in volume, it is more preferable that Fe site be replaced by an element having a valence of +4.

It is preferable that the trivalent element M, which replaces Fe site, be Y, because Y does not change in valence during synthesis. Since there occurs no change in valence during synthesis, the cathode active material can be synthesized stably.

It is preferable that the tetravalent element M, which replaces Fe site, be Zr or Sn, because Zr and Sn do not change in valence during synthesis. Since there occurs no change in valence during synthesis, the cathode active material can be synthesized stably.

It is preferable that M in general formula (1) have a valence of +3 or +4, and it is more preferable that every M have a valence of +3 or that every M have a valence of +4.

The substitution amount x on Fe site falls within a range of larger than 0 to 0.5 or smaller. If the substitution amount x on Fe site falls within the above range, it is possible to prevent (i) a significant reduction in the discharging capacity of a battery in which the cathode active material is used and (ii) a volume change occurring during Li insertion and desorption.

The larger the amount of substitution on Fe site is, the better the rate of change in volume can be suppressed. In other words, the larger the amount of substitution on Fe site is, the better the volume maintenance ratio is at 500 cycles. If the rate of change in volume is 4% or less, the volume maintenance ratio can be 90% or more.

On the other hand, the larger the amount of substitution on Fe site, the smaller the initial capacity is. In the case where Fe is replaced by Zr, the substitution amount x on Fe site is (i) preferably 0.35 or less to obtain an initial capacity of 100 mAh/g or greater, (ii) more preferably 0.3 or less to obtain an initial capacity of 110 mAh/g or greater, or (iii) even more preferably 0.25 or less to obtain an initial capacity of 120 mAh/g or greater.

In the case where Fe is replaced by Sn, the substitution amount x on Fe site is (i) preferably 0.3 or less to obtain an initial capacity of 100 mAh/g or greater, (ii) more preferably 0.25 or less to obtain an initial capacity of 110 mAh/g or greater, or (iii) even more preferably 0.2 or less to obtain an initial capacity of 120 mAh/g or greater.

In the case where Fe is replaced by Y, the substitution amount x on Fe site is (i) preferably 0.35 or less to obtain an initial capacity of 100 mAh/g or greater, (ii) more preferably 0.3 or less to obtain an initial capacity of 110 mAh/g or greater, or (iii) even more preferably 0.25 or less to obtain an initial capacity of 120 mAh/g or greater.

In the case where Fe is replaced by Al, the substitution amount x on Fe site is (i) preferably 0.45 or less to obtain an initial capacity of 100 mAh/g or greater, more preferably 0.4 or less to obtain an initial capacity of 110 mAh/g or greater, or (iii) even more preferably 0.3 or less to obtain an initial capacity of 120 mAh/g or greater.

When Fe site is replaced by metal atoms having a valence of +3 and every Fe has a valence of +2, the same amount of Si as the amount of substitution of Fe site is required for the maintenance of electroneutrality. In this case, the amount of substitution is preferably 0.25 or greater for Al and 0.15 or greater for Y to keep the rate of change in volume to 5% or less. Further, the amount of substitution is preferably 0.35 or greater for Al and 0.2 or greater for Y to keep the rate of change in volume to 4% or less.

When Fe site is replaced by metal atoms having a valence of +4 and every Fe has a valence of +2, the amount of Si twice as large as the amount of substitution of Fe site is required for the maintenance of electroneutrality. In this case, the amount of substitution is preferably 0.05 or greater for Zr and 0.15 or greater for Sn to keep the rate of change in volume to 5% or less. The amount of substitution is preferably 0.15 or greater for Zr and 0.25 or greater for Sn to keep the rate of change in volume to 4% or less. The amount of substitution is preferably 0.2 or greater for Zr and 0.3 or greater for Sn to keep the rate of change in volume to 3% or less. Further, the amount of substitution is preferably 0.25 or greater for Zr to keep the rate of change in volume to 2% or less.

The present invention encompasses the following embodiment: When Fe site is replaced by Zr atoms having a valence of +4 and every Fe has a valence of +2, the substitution amount x of Zr may be within the range $0.05 \leq x \leq 0.15$.

The aforementioned cathode active material according to the present embodiment can be produced by using any combination of a carbonate of each element, a hydroxide of each element, a chloride salt of each element, a sulfate salt of each element, an acetate salt of each element, an oxide of each element, an oxalate of each element, a nitrate salt of each element, etc. as raw materials. Examples of production methods include methods such as a solid-phase method, a sol-gel process, melt extraction, a mechanochemical method, a coprecipitation method, a hydrothermal method, evaporative decomposition, etc. Further, as has been commonly done in olivine-type lithium iron phosphate, electrical conductivity may be improved by covering the cathode active material with a carbon film.

As described above, the cathode active material of the present invention may preferably be arranged such that a rate of change in volume of a unit cell in $Li_xFe_{1-x}M_xP_{1-y}Si_yO_4$ is 5% or less with respect to a volume of a unit cell in General Formula (1).

According to the foregoing structure, the rate of change in volume is 5% or less. This makes it possible to better prevent a cathode from expanding or contracting due to charging and discharging, thus making it possible to provide a cathode active material capable of providing a long-life battery.

The cathode active material of the present invention may preferably be arranged such that a rate of change in volume of a unit cell in $Li_xFe_{1-x}M_xP_{1-y}Si_yO_4$ is 4% or less with respect to a volume of a unit cell in General Formula (1).

According to the foregoing structure, the rate of change in volume is 4% or less. This makes it possible to better prevent a cathode from expanding or contracting due to charging and discharging, thus making it possible to provide a cathode active material capable of providing a long-life battery.

The cathode active material of the present invention may preferably be arranged such that the valence of M is +4.

The foregoing structure, which is highly effective in suppressing the rate of change in volume, it possible to better prevent the cathode from expanding or contracting due to charging and discharging, thus making it possible to provide a cathode active material capable of providing a long-life battery.

The cathode active material of the present invention may preferably be arranged such that M in General Formula (1) is Zr; and $0.05 \leq x \leq 0.5$.

According to the foregoing structure, the rate of change in volume is approximately 5% or less. This makes it possible to better prevent a cathode from expanding or contracting due to charging and discharging, thus making it possible to provide a cathode active material capable of providing a long-life battery.

The cathode active material of the present invention may preferably be arranged such that M in General Formula (1) is Zr; and $0.15 \leq x \leq 0.5$.

According to the foregoing structure, the rate of change in volume is approximately 4% or less. This makes it possible to better prevent a cathode from expanding or contracting due to charging and discharging, thus making it possible to provide a cathode active material capable of providing a long-life battery.

The cathode active material of the present invention may preferably be arranged such that M in General Formula (1) is Zr; and $0.25 \leq x \leq 0.5$.

According to the foregoing structure, the rate of change in volume is approximately 2% or less. This makes it possible to even better prevent a cathode from expanding or contracting due to charging and discharging, thus making it possible to provide a cathode active material capable of providing a battery with an even long life.

The cathode active material of the present invention may preferably be arranged such that M in General Formula (1) is Sn; and $0.25 \leq x \leq 0.5$.

According to the foregoing structure, the rate of change in volume is approximately 4% or less. This makes it possible to better prevent a cathode from expanding or contracting due to charging and discharging, thus making it possible to provide a cathode active material capable of providing a long-life battery.

The cathode active material of the present invention may preferably be arranged such that the valence of M in General Formula (1) is +3.

The cathode active material of the present invention may preferably be arranged such that M in General Formula (1) is Y; and $0.2 \leq x \leq 0.5$.

According to the foregoing structure, the rate of change in volume is approximately 4% or less. This makes it possible to better prevent a cathode from expanding or contracting due to charging and discharging, thus making it possible to provide a cathode active material capable of providing a long-life battery. Further, because Y does not change in valence during synthesis of a cathode active material, the cathode active material can be synthesized stably.

The cathode active material of the present invention may preferably be arranged such that M in General Formula (1) is Al; and $0.35 \leq x \leq 0.5$.

According to the foregoing structure, the rate of change in volume is approximately 4% or less. This makes it possible to better prevent a cathode from expanding or contracting due to charging and discharging, thus making it possible to provide a cathode active material capable of providing a long-life battery.

The cathode active material of the present invention may preferably be arranged such that the average valence of Fe in General Formula (1) is +2.

The foregoing structure makes it possible to better prevent the cathode from expanding or contracting due to charging and discharging, thus making it possible to provide a cathode active material capable of providing a long-life battery.

The cathode active material of the present invention may preferably be arranged such that M in General Formula (1) is Zr; and $0.05 \leq x \leq 0.15$.

The foregoing structure makes it possible to better prevent the cathode from expanding or contracting due to charging and discharging, thus making it possible to provide a cathode active material capable of providing a long-life battery.

(II) Nonaqueous Secondary Battery

A nonaqueous secondary battery according to the present embodiment has a cathode, an anode, an electrolyte, and a separator. Each of the components is described below. It should be noted that it is preferable that the nonaqueous secondary battery according to the present embodiment be a laminate battery, a layered cuboidal battery, a wound cuboidal battery, or a wound cylindrical battery.

(a) Cathode

The cathode, composed of such a cathode active material according to the present embodiment, a conductive material, and a binder, can be made, for example, by a publicly-known method such as application to a current collector of a slurry obtained by mixing the active material, the conductive material, and the binder with an organic solvent.

Usable examples of the binder (binding agent) include polytetrafluoroethylene, polyvinylidene fluoride, polyvinylchloride, ethylene-propylene diene polymer, styrene-butadiene rubber, acrylonitrile-butadiene rubber, fluorocarbon rubber, polyvinyl acetate, polymethyl methacrylate, polyethylene, nitrocellulose, etc.

Usable examples of the conductive material include acetylene black, carbon, graphite, natural graphite, artificial graphite, needle coke, etc.

Usable examples of the current collector include a foam (porous) metal having continuous holes, a metal shaped in a honeycomb pattern, a sintered metal, an expanded metal, nonwoven cloth, a plate, foil, a perforated plate, perforated foil, etc.

Usable examples of the organic solvent include N-methylpyrrolidone, toluene, cyclohexane, dimethylformamide, dimethylacetoamide, methyl ethyl ketone, methyl acetate, methyl acrylate, diethyltriamine, N—N-dimethylaminopropylamine, ethylene oxide, tetrahydrofuran, etc.

It is preferable that the cathode have a thickness of approximately 0.01 to 20 mm. Too great a thickness undesirably causes a decrease in electrical conductivity, and too small a thickness undesirably causes a decrease in capacity par unit area. It should be noted that the cathode, obtained by application and drying, may be consolidated by a roller press, etc. so that the active material has a higher filling density.

(b) Anode

The anode can be made by a publicly-known method. Specifically, the anode can be made by the same method as described in the method for making the cathode, i.e., by mixing such a publicly-known binding agent and such a publicly-known conductive material as named in the method for making the cathode with an anodic active material, molding the mixed powder into a sheet, and then pressure-bonding the molded product to a net (current collector) made of a conducting material such as stainless steel or copper. Alternatively, the anodic can also be made by applying, onto a substrate made of metal such as copper, a slurry obtained by mixing the mixed powder with such a publicly-known organic solvent as named in the method for making the cathode.

The anodic active material may be a publicly-known material. In order to constitute a high-energy density battery, it is preferable that the potential of insertion/desorption of lithium be close to the deposition/dissolution potential of metal lithium. Typical examples of such an anodic active material include carbon materials such as natural or artificial graphite in the form of particles (scales, clumps, fibers, whisker, spheres, crushed particles, etc.).

Examples of the artificial graphite include graphite obtainable by graphitizing mesocarbon microbeads, mesophase pitch powder, isotropic pitch powder, etc. Alternatively, it is possible to use graphite particles having amorphous carbon adhering to their surfaces. Among these, natural graphite is more preferable because it is inexpensive, close in oxidation-reduction potential to lithium, and can constitute a high-energy density battery.

Alternatively, it is possible to use a lithium transition metal oxide, a transition metal oxide, oxide silicon, etc. as the anodic active material. Among these, $Li_4Ti_5O_{12}$ is more preferable because it is high in potential flatness and small in volume change due to charging and discharging.

(c) Electrolyte

Usable examples of the electrolyte include an organic electrolyte, a gel electrolyte, a polymer solid electrolyte, an inorganic solid electrolyte, a molten salt, etc. After injection of the electrolyte, an opening in the battery is sealed. It is possible to turn on electricity before the sealing and remove gas generated.

Examples of an organic solvent that constitutes the organic electrolyte include: cyclic carbonates such as propylene carbonate (PC), ethylene carbonate (EC), and butylene carbonate; chain carbonates such as dimethyl carbonate (DMC), diethyl carbonate (DEC), ethyl methyl carbonate, and dipropyl carbonate; lactones such as γ-butyrolactone (GBL), γ-Valerolactone; furans such as tetrahydrofuran and 2-methyl tetrahydrofuran; ethers such as diethyl ether, 1,2-dimethoxy ethane, 1,2-diethoxy ethane, ethoxy methoxy ethane, dioxane; dimethyl sulfoxide; sulforan; methyl sulforan; acetonitrile; methyl formate; methyl acetate; etc. These organic solvents can be used alone or in combination of two or more of them.

Further, the cyclic carbonates such as PC, EC, and butylene carbonate are high boiling point solvents and, as such, are suitable as a solvent to be mixed with GBL.

Examples of an electrolyte salt that constitutes the organic electrolyte include lithium salts such as fluoroboric lithium ($LiBF_4$), lithium hexafluorophosphate ($LiPF_6$), trifluoromethanesulfonic lithium ($LiCF_3SO_3$), trifluoroacetic lithium ($LiCF_3COO$), trifluoracetic bis(trifluoromethanesulfone)imide ($LiN(CF_3SO_2)_2$), etc. These electrolyte salts can be used alone or in combination of two or more of them. A suitable salt concentration of the electrolyte is 0.5 to 3 mol/l.

(d) Separator

Examples of the separator include a porous material, non-woven cloth, etc. It is preferable that the separator be made of such a material as mentioned above that neither dissolves not swells in response to the organic solvent contained in the electrolyte. Specific examples are polyester polymers, polyolefin polymers (e.g., polyethylene, polypropylene), ether polymers, and inorganic materials such glass, etc.

The components, such as the separator, a battery case, and other structural materials, of the battery according to the present embodiment may be, but are not particularly limited to, various materials that are used in a conventional publicly-known nonaqueous secondary battery.

(e) Method for Producing a Nonaqueous Secondary Battery

The nonaqueous secondary battery according to the present embodiment can be made, for example, by layering the cathode and the anodic in such a way that the separator is sandwiched between them. The layered electrode may have a rectangular planar shape. Further, when a cylindrical or flat battery is made, the layered electrode may be wound.

Such a single layered electrode or a plurality of such layered electrodes is/are inserted into a battery container. Usually, the cathode(s) and the anodic(s) are each connected to an external conductive terminal of the battery. After that, the battery container is sealed so that the electrode(s) and the separator(s) are shielded from outside air.

In the case of a cylindrical battery, the battery container is usually sealed by fitting a resin gasket in the opening of the battery container and then caulking the battery container. In the case of a cuboidal battery, the battery container can be sealed by mounting a metal lid (called a sealing plate) on the opening and then joining them by welding. Other than these methods, the battery container can be sealed by a binding agent or by fastening it with a bolt through a gasket. Furthermore, the battery container can be sealed by a laminate film obtained by joining a thermoplastic resin on top of metal foil. When sealed, the battery container may be provided with an opening through which the electrolyte is injected.

As described above, the cathode active material according to the present invention undergoes only a small change in volume during charging/discharging, and is thus less likely to cause destruction of secondary particles or destruction of the conductive path between the cathode active material and the conductive material. Therefore, the cathode active material itself has a long life.

An electrode prepared by applying a conventional cathode active material onto a metal foil made of, for example, aluminum is, since the cathode active material has a large change in volume during charging/discharging, problematic in that the thickness of the electrode itself changes during charging/discharging.

If the thickness of the electrode itself changes, a battery armor containing a collection of such electrodes is repeatedly subjected to stress. In the case where the battery armor is made of a metal, such repeated stress may cause a crack in the battery armor itself or a sealing part. In the case where the battery armor is made of, for example, a laminated material, repeated stress causes only a little fatigue, but changes the thickness of the battery itself, which in turn causes stress to a module containing such batteries stacked on one another. This may decrease reliability of the module.

In contrast, an electrode prepared by applying the cathode active material of the present invention onto a metal foil made of, for example, aluminum, since the cathode active material has only a small change in volume during charging/discharging, has a small change in thickness during charging/discharging. This reduces a change in the thickness of the battery during charging/discharging, and thus reduces stress on the armor of the battery in the case where the armor is made of a metal. As a result, it is possible to provide a highly reliable battery.

A battery including the cathode of the present invention, as described above, excels in long-term reliability, and is thus suitably used to store power over an extended period of time, the power including solar power, late-night power, and power from a natural energy such as wind power, geothermal power, and wave power.

The present invention is not limited to the description of the embodiments above, but may be altered by a skilled person within the scope of the claims. An embodiment based on a proper combination of technical means disclosed in different embodiments is encompassed in the technical scope of the present invention.

EXAMPLES

The present invention is described below in more detail with reference to Examples; however, the present invention is not limited to Examples below. It should be noted that reagents etc. used in Examples are highest quality reagents manufactured by Kishida Chemical Co., Ltd.

(I) Calculation of Rate of Change in Volume and Theoretical Discharging Capacity and Evaluation of Calculation Results

[References 1 to 4]

For each of the compounds listed in Table 1, the rate of change in volume of the compound (the rate of change in volume of a unit cell in $Li_xFe_{1-x}M_xP_{1-y}Si_yO_4$ relative to the volume of a unit cell in general formula (1)) was calculated according to the VASP, which is a general program for first principle calculation.

Specifically, the volume of a unit cell having four Li atoms, four Fe atoms, four P atoms, and sixteen O atoms was calculated under the following conditions: ENCUT=400, IBRION=1, ISIF=3, EDIFF=1.0e-05, EDIFFG=-0.02, ISPIN=2. Further, the value U of Fe was 3.71.

The rate of change in volume was calculated according to the following formula:

Rate of change in volume(%)=$(V_0-V_1)/V_0 \times 100$, where $V_0$ is the volume as calculated in the presence of Li; and $V_1$ is the volume as calculated in the absence of Li.

For consideration of the amounts of substitution, calculations were performed on structures twice and four times as large as a unit cell, with half and a quarter the amount of substitution of each element. The calculations confirmed that the amount of substitution was directly proportional to a lattice constant. The rate of change in volume for each amount of substitution was calculated in a similar manner.

Further, from (i) the amount of change in valence of Fe from +2 to +3 during discharging and (ii) the molecular weight of the compound, a theoretical discharging capacity of the compound was calculated. Specifically, the theoretical discharging capacity was calculated according to the following formula:

Theoretical discharging capacity(mAh/g)=$F$/3600/$Mw$×1000×(1−$x$), where F is a Faraday constant; Mw is the molecular weight of the compound; and x, which is equivalent to x in General Formula (1), is the amount of substitution by M of Fe site.

Table 1 shows the results of the above calculation.

It should be noted that among values that are calculated according to first principle calculation, such a rate of change in volume is calculated with high reproducibility because the lattice constant is a value that contains few errors in calculation. These calculation results coincide highly accurately with values obtained by actually preparing cathode active materials and measuring their rates of change in volume.

The above calculation of the theoretical discharging capacity uses a general formula for calculating a theoretical capacity, and thus uses a change in valence of a transition metal element from +2 to +3. The calculation gives a maximum value of the capacity of an actually synthesized material. As will be described in Reference 5 below, lithium iron phosphate with no substitution achieved a capacity substantially equivalent to the theoretical capacity. These calculation results should coincide highly accurately with values obtained by actually preparing batteries with use of cathode active materials and measuring their discharging capacities.

[Reference 5]

The accuracy of the calculation results was confirmed by actually preparing cathode active materials from $LiFePO_4$ and $FePO_4$, respectively, and calculating their rates of change in volume. Table 2 shows the results.

<Synthesis of $LiFePO_4$>

A lithium source LiOH, an iron source $Fe(CH_3COO)_2$, and a phosphate source $H_3PO_4$ were used as starting materials, and these starting materials were measured out so that the molar ratio was Li:Fe:P=1:1:1. Next, the Fe source and the P source were put into a small amount of water, and the Li source was put after the Fe source had been completely dissolved. Into this aqueous solution, sucrose containing 20 percent by mass of $LiFePO_4$, which would be a final product, was added. This aqueous solution was dried overnight at 60° C. in a drying furnace under a nitrogen flow, and then sintered for twelve hours at 600° C. Thus synthesized was $LiFePO_4$ single-phase powder, which is an olivine-type cathode active material.

<Measurement of the Rate of Change in Volume>

The $LiFePO_4$ cathode active material thus synthesized was crushed in a mortar into fine powder, and the lattice constant was calculated by X-ray measurement at 10° to 90° at room temperature with use of a Cu tube.

Further, the lattice constant of an active material after desorption of Li was calculated by using, as a cathode active material after Li desorption, a cathode active material whose charging capacity had been confirmed and which had the same composition as in a state of Li desorption and performing X-ray measurement on the cathode active material at room temperature. Specifically, XRD measurement of the cathode active material after Li desorption was performed after preparing a battery according to the after-mentioned

TABLE 1

| Ref | | | Value of x | | | | | | | | | |
|---|---|---|---|---|---|---|---|---|---|---|---|---|
| | | | 0.05 | 0.10 | 0.15 | 0.20 | 0.25 | 0.30 | 0.35 | 0.40 | 0.45 | 0.50 |
| 1 | $Li(Fe_{1-x}Zr_x)(P_{1-2x}Si_{2x})O_4$ | Rate of change in volume (%) | 5.84 | 4.65 | 3.46 | 2.26 | 1.05 | −0.17 | −1.39 | | | |
| | | Theoretical discharging capacity (mAh/g) | 159.8 | 149.8 | 140.1 | 130.6 | 121.2 | 112.0 | 103.0 | | | |
| 2 | $Li(Fe_{1-x}Sn_x)(P_{1-2x}Si_{2x})O_4$ | Rate of change in volume (%) | 6.35 | 5.68 | 5.00 | 4.33 | 3.65 | 2.98 | 2.30 | | | |
| | | Theoretical discharging capacity (mAh/g) | 158.4 | 147.3 | 136.6 | 126.3 | 116.4 | 106.8 | 97.5 | | | |
| 3 | $Li(Fe_{1-x}Y_x)(P_{1-x}Si_x)O_4$ | Rate of change in volume (%) | 6.16 | 5.31 | 4.46 | 3.61 | 2.76 | 1.92 | 1.08 | 0.24 | | |
| | | Theoretical discharging capacity (mAh/g) | 159.9 | 150.1 | 140.4 | 130.9 | 121.6 | 112.5 | 103.5 | 94.7 | | |
| 4 | $Li(Fe_{1-x}Al_x)(P_{1-x}Si_x)O_4$ | Rate of change in volume (%) | 6.59 | 6.16 | 5.73 | 5.29 | 4.85 | 4.41 | 3.97 | 3.52 | 3.08 | 2.63 |
| | | Theoretical discharging capacity (mAh/g) | 163.1 | 156.1 | 148.9 | 141.6 | 134.2 | 126.6 | 118.8 | 110.9 | 102.8 | 94.5 |

As shown in Table 1, each of the compounds of References 1 to 4 exhibited a low rate of change in volume without significantly reducing its theoretical discharging capacity. This low rate of change in volume means that each of the compounds of References 1 to 4 had a low rate of change in volume during charging and discharging, and was therefore a cathode active material with which a long-life battery can be produced.

method for preparing a battery, taking out the cathode with the battery fully charged, and then washing the cathode with ethanol.

After calculating the volume of a structure during charging and the volume of the structure during discharging according to the lattice constant of the structure during charging and the lattice constant of the structure during discharging, the rate of change in volume (%) due to charging and discharging was calculated according to the following formula:

Rate of change in volume(%)=(1−volume of structure during charging/volume of structure during discharging)×100.

It should be noted here that the structure during charging is a structure during Li desorption and the structure during discharging is an initial structure during synthesis.

<Method for Preparing a Battery>

After the cathode active material, acetylene black (marketed as "Denka Black"; manufactured by Denki Kagaku Kogyo Kabushiki Kaisha), and PVdF (polyvinylidene fluoride) (marketed as "KF Polymer"; manufactured by Kureha Corporation) were mixed with a mass ratio of 70:30:10, the mixture was mixed with N-methylpyrrolidone (manufactured by Kishida Chemical Co., Ltd.) to form slurry. A cathode was obtained by applying the slurry onto a 20-μm-thick aluminum foil so that the cathode had a thickness of 50 μm to 100 μm. It should be noted that the cathode had an electrode size of 2 cm×2 cm.

After the cathode had been dried, the cathode was used as an electrode and Li metal was used as a counter electrode, with 50 ml of an electrolyte contained in a 100-ml glass container. The electrolyte (manufactured by Kishida Chemical Co., Ltd.) used was obtained by dissolving $LiPF_6$ in a solvent so that the concentration was 1.4 mol/l, and the solvent used was obtained by mixing ethylene carbonate and diethyl carbonate with a volume ratio of 7:3.

The battery prepared as above was charged and discharged at a rate of 0.1 C, which showed that the battery had a capacity of 163 mAh/g.

TABLE 2

| Composition | Item | Experimental value | Calculated value |
|---|---|---|---|
| $LiFePO_4$ | a axis (angstrom) | 10.33 | 10.207 |
| | b axis (angstrom) | 6.01 | 5.978 |
| | c axis (angstrom) | 4.69 | 4.666 |
| | Volume (angstrom$^3$) | 291.17 | 284.71 |
| $FePO_4$ | a axis (angstrom) | 9.82 | 9.753 |
| | b axis (angstrom) | 5.79 | 5.73 |
| | c axis (angstrom) | 4.79 | 4.737 |
| | Volume (angstrom$^3$) | 272.35 | 264.73 |
| | Expansion/Contraction (%) | 6.5 | 7.0 |

As shown in Table 2, each of the actually prepared cathode active materials exhibited a rate of change in volume of 6.5%, which is almost the same as the calculated value of 7.0%.

(II) Preparation of a Cathode Active Material

Example 1

A lithium source $Li(OC_2H_5)$, an iron source $Fe(CH_3COO)_2$, a zirconium source $Zr(OC_2H_5)_4$, a phosphate source $(NH_4)_2HPO_4$, and a silicon source $Si(OC_2H_5)_4$ were used as starting materials, and these starting materials were measured out so that the molar ratio was Li:Fe:Zr:P:Si=1:0.875:0.125:0.75:0.25. Next, the Li source, the Zr source, and the Si source were dissolved in 20 g of butanol. Further, the Fe source and the P source were dissolved in water whose number of moles was four times as large as that total number of moles of metal alcoxide (the Fe source, the Si source, and the Li source). After one hour of stirring of a mixture of the butanol, in which the metal alcoxide had been dissolved, and the water, in which the Fe source and the P source had been dissolved, the resulting mixture was dried at 60° C. in a dryer into a powdery precursor.

The resultant amorphous precursor was sintered for twelve hours at 600° C. in a nitrogen atmosphere. Thus synthesized was $LiFe_{0.875}Zr_{0.125}P_{0.75}Si_{0.25}O_4$ single-phase powder, which is an olivine-type cathode active material. The lattice constants of the resultant cathode active material along the a axis, the b axis, and the c were 10.144, 6.003, and 4.712, respectively.

Example 2

Preparation of a Cathode Active Material

A lithium source $LiCH_3COO$, an iron source $Fe(NO_3)_3 \cdot 9H_2O$, a zirconium source $ZrCl_4$, a phosphate source $H_3PO_4$ (85%), and a silicon source $Si(OC_2H_5)_4$ were used as starting materials. These starting materials were measured out so that the molar ratio is Li:Fe:Zr:P:Si=1:0.75:0.25:0.5:0.5, with the lithium source $LiCH_3COO$ used in an amount of 1.3196 g. These starting materials were dissolved in 30 ml of $C_2H_5OH$ and stirred by a stirrer for 48 hours at room temperature. After that, the solvent was removed at 40° C. in a constant-temperature bath, with the result that a brownish-red powder was obtained.

After addition of 15 percent by weight of sucrose relative to the resultant powder, they were mixed well in an agate mortar, and the resulting mixture was pressure-molded into pellets. The pellets were sintered for twelve hours at 600° C. in a nitrogen atmosphere. Thus synthesized was $LiFe_{0.75}Zr_{0.25}P_{0.5}Si_{0.5}O_4$ single-phase powder. The resultant cathode active material is referred to as "Al".

<Preparation of a Cathode Electrode>

Approximately 1 gram of the cathode active material A2 obtained as above was weighed out, crushed in an agate mortar, and then mixed with approximately 10 percent by weight of a conductive agent, acetylene black (marketed as "Denka Black"; manufactured by Denki Kagaku Kogyo Kabushiki Kaisha), relative of the cathode active material and approximately 10 percent by weight of a binding agent, polyvinylidene fluoride resin powder, relative to the cathode active material.

This mixture was dissolved in a solvent such as N-methyl-2-pyrrolidone to form slurry, and the slurry was applied onto both surfaces of a 20-μm-thick aluminum foil by a doctor blade method so that the amount of application was approximately 5 mg/cm$^2$. This electrode was dried, and then cut so that the applied electrode surface was 2 cm×2 cm. The electrode was then pressed to provide a cathode electrode.

Example 3

A lithium source $LiCH_3COO$, an iron source $Fe(NO_3)_3 \cdot 9H_2O$, a zirconium source $ZrCl_4$, a phosphate source $H_3PO_4$ (85%), and a silicon source $Si(OC_2H_5)_4$ were used as starting materials. These starting materials were measured out so that the molar ratio is Li:Fe:Zr:P:Si=1:0.85:0.15:0.7:0.3, with the lithium source $LiCH_3COO$ used in an amount of 1.3196 g. These starting materials were dissolved in 30 ml of $C_2H_{50}H$ and stirred by a stirrer for 48 hours at room temperature. After that, the solvent was removed at 40° C. in a constant-temperature bath, with the result that a brownish-red powder was obtained.

After addition of 15 percent by weight of sucrose relative to the resultant powder, they were mixed well in an agate mortar, and the resulting mixture was pressure-molded into pellets.

The pellets were sintered for twelve hours at 600° C. in a nitrogen atmosphere. Thus synthesized was $LiFe_{0.85}Zr_{0.15}P_{0.7}Si_{0.3}O_4$ single-phase powder. The resultant cathode active material is referred to as "A2".

The operation performed in Example 2 was performed also on the cathode active material A2 to prepare a cathode electrode.

Example 4

A lithium source $LiCH_3COO$, an iron source $Fe(NO_3)_3 \cdot 9H_2O$, a zirconium source $ZrCl_4$, a phosphate source $H_3PO_4$ (85%), and a silicon source $Si(OC_2H_5)_4$ were used as starting materials. These starting materials were measured out so that the molar ratio is Li:Fe:Zr:P:Si=1:0.875:0.125:0.75:0.25, with the lithium source $LiCH_3COO$ used in an amount of 1.3196 g. These starting materials were dissolved in 30 ml of $C_2H_5OH$ and stirred by a stirrer for 48 hours at room temperature. After that, the solvent was removed at 40° C. in a constant-temperature bath, with the result that a brownish-red powder was obtained.

After addition of 15 percent by weight of sucrose relative to the resultant powder, they were mixed well in an agate mortar, and the resulting mixture was pressure-molded into pellets. The pellets were sintered for twelve hours at 600° C. in a nitrogen atmosphere. Thus synthesized was $LiFe_{0.875}Zr_{0.125}P_{0.75}Si_{0.25}O_4$ single-phase powder. The resultant cathode active material is referred to as "A3".

The operation performed in Example 2 was performed also on the cathode active material A3 to prepare a cathode electrode.

Example 5

A lithium source $LiCH_3COO$, an iron source $Fe(NO_3)_3 \cdot 9H_2O$ and $ZrCl_4$, a phosphate source $H_3PO_4$ (85%), and a silicon source $Si(OC_2H_5)_4$ were used as starting materials. These starting materials were measured out so that the molar ratio is Li:Fe:Zr:P:Si=1:0.9:0.1:0.8:0.2, with the lithium source $LiCH_3COO$ used in an amount of 1.3196 g. These starting materials were dissolved in 30 ml of $C_2H_5OH$ and stirred by a stirrer for 48 hours at room temperature. After that, the solvent was removed at 40° C. in a constant-temperature bath, with the result that a brownish-red powder was obtained.

After addition of 15 percent by weight of sucrose relative to the resultant powder, they were mixed well in an agate mortar, and the resulting mixture was pressure-molded into pellets. The pellets were sintered for twelve hours at 600° C. in a nitrogen atmosphere. Thus synthesized was $LiFe_{0.9}Zr_{0.1}P_{0.8}Si_{0.2}O_4$ single-phase powder. The resultant cathode active material is referred to as "A4".

The operation performed in Example 2 was performed also on the cathode active material A4 to prepare a cathode electrode.

Example 6

A lithium source $LiCH_3COO$, an iron source $Fe(NO_3)_3 \cdot 9H_2O$, a zirconium source $ZrCl_4$, a phosphate source $H_3PO_4$ (85%), and a silicon source $Si(OC_2H_5)_4$ were used as starting materials. These starting materials were measured out so that the molar ratio is Li:Fe:Zr:P:Si=1:0.93:0.07:0.86:0.14, with the lithium source $LiCH_3COO$ used in an amount of 1.3196 g. These starting materials were dissolved in 30 ml of $C_2H_5OH$ and stirred by a stirrer for 48 hours at room temperature. After that, the solvent was removed at 40° C. in a constant-temperature bath, with the result that a brownish-red powder was obtained.

After addition of 15 percent by weight of sucrose relative to the resultant powder, they were mixed well in an agate mortar, and the resulting mixture was pressure-molded into pellets. The pellets were sintered for twelve hours at 600° C. in a nitrogen atmosphere. Thus synthesized was $LiFe_{0.93}Zr_{0.07}P_{0.86}Si_{0.14}O_4$ single-phase powder. The resultant cathode active material is referred to as "A5".

The operation performed in Example 2 was performed also on the cathode active material A5 to prepare a cathode electrode.

Example 7

A lithium source $LiCH_3COO$, an iron source $Fe(NO_3)_3 \cdot 9H_2O$, a zirconium source $ZrCl_4$, a phosphate source $H_3PO_4$ (85%), and a silicon source $Si(OC_2H_5)_4$ were used as starting materials. These starting materials were measured out so that the molar ratio is Li:Fe:Zr:P:Si=1:0.95:0.05:0.9:0.1, with the lithium source $LiCH_3COO$ used in an amount of 1.3196 g. These starting materials were dissolved in 30 ml of $C_2H_5OH$ and stirred by a stirrer for 48 hours at room temperature. After that, the solvent was removed at 40° C. in a constant-temperature bath, with the result that a brownish-red powder was obtained.

After addition of 15 percent by weight of sucrose relative to the resultant powder, they were mixed well in an agate mortar, and the resulting mixture was pressure-molded into pellets. The pellets were sintered for twelve hours at 600° C. in a nitrogen atmosphere. Thus synthesized was $LiFe_{0.95}Zr_{0.05}P_{0.9}Si_{0.1}O_4$ single-phase powder. The resultant cathode active material is referred to as "A6".

The operation performed in Example 2 was performed also on the cathode active material A6 to prepare a cathode electrode.

Comparative Example 1

A lithium source $LiCH_3COO$, an iron source $Fe(NO_3)_3 \cdot 9H_2O$, and a phosphate source $H_3PO_4$ (85%) were used as starting materials. These starting materials were measured out so that the molar ratio is Li:Fe:P=1:1:1, with the lithium source $LiCH_3COO$ used in an amount of 1.3196 g. These starting materials were dissolved in 30 ml of $C_2H_5OH$ and stirred by a stirrer for 48 hours at room temperature. After that, the solvent was removed at 40° C. in a constant-temperature bath, with the result that a brownish-red powder was obtained.

After addition of 15 percent by weight of sucrose relative to the resultant powder, they were mixed well in an agate mortar, and the resulting mixture was pressure-molded into pellets. The pellets were sintered for twelve hours at 600° C. in a nitrogen atmosphere. Thus synthesized was a cathode active material. The resultant cathode active material is referred to as "B1".

The operation performed in Example 2 was performed also on the cathode active material B1 to prepare a cathode electrode.

(III) Evaluation of Cathode Active Material (III-I) X-Ray Analysis

The cathode active materials A1 to A6 and B1 thus obtained were each crushed in an agate mortar and subjected to a X-ray analysis apparatus (marketed as MiniFlexII; manufactured by Rigaku Co., Ltd.) to give a powder X-ray diffraction pattern. FIGS. 1 through 7 show X-ray diffraction patterns for the cathode active materials A1 to A6 and B1, respectively, as the results of the X-ray analysis.

(III-II) Evaluation of Valence of Fe

The respective cathode active materials prepared in the Examples and Comparative Example were each crushed in an agate mortar and subjected to a Mössbauer spectrometry with use of a Mössbauer spectroscopy device.

A Mössbauer absorption spectrum was measured under the following conditions: A gamma ray source was $^{57}$Co, which is an isotope of cobalt. A sample targeted for the measurement was placed in an amount of 200 mg between the gamma ray source and a gamma ray detector. The sample was vibrated at an amplitude of 5 cm±6 mm/s with respect to the detector. A Mössbauer spectrum was measured by measuring absorption of gamma rays.

Assuming that four absorption peaks centered at the respective velocity regions of −0.1 mm/s, 0 mm/s, 1 mm/s, and 2.7 mm/s were Lorentz functions, fittng was performed by a least-squares method on the data obtained as above. The respective peaks at the velocity regions of −0.1 mm/s and 2.7 mm/s were presumed to be due to absorption by $Fe^{2+}$, and the respective peaks at the velocity regions of 0 mm/s and 1 mm/s were presumed to be due to absorption by $Fe^{3+}$. A ratio between $Fe^{2+}$ and $Fe^{3+}$ was calculated from an area ratio of the respective peaks for $Fe^{2+}$ and $Fe^{3+}$.

Figure 8:
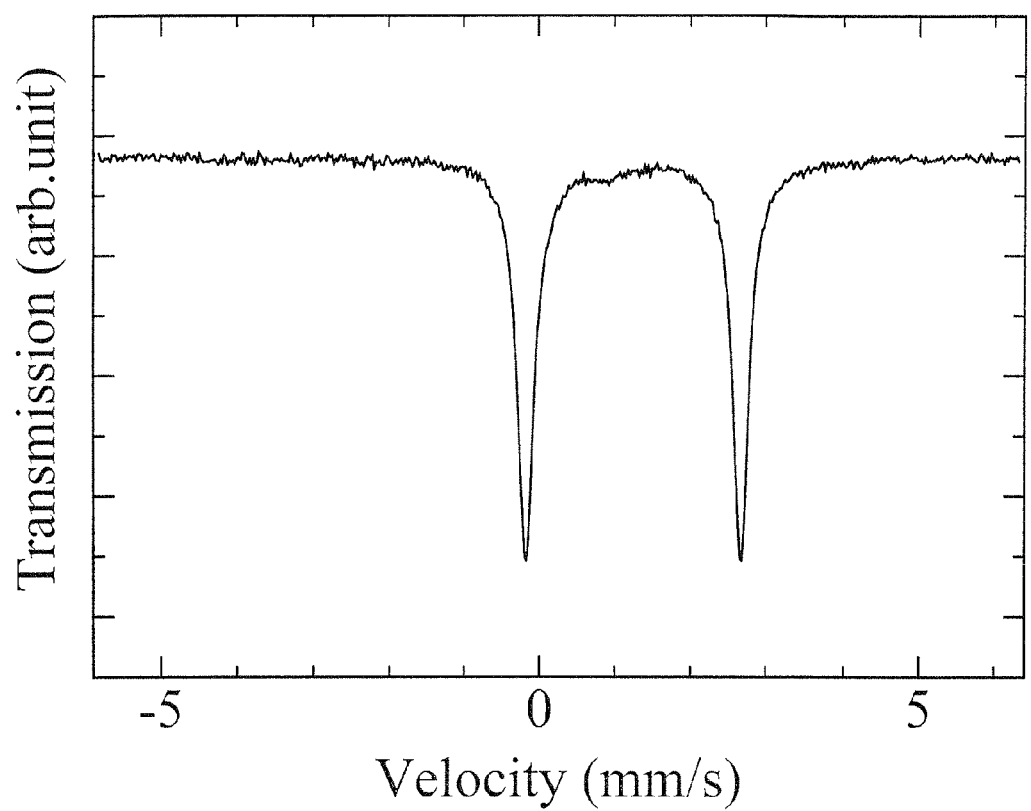
FIG. 8 is a graph illustrating an absorption spectrum measured by Mössbauer spectrometry of the cathode active material prepared in Example 2.

FIG. 8 shows an absorption spectrum, measured by the above method, of the cathode active material A1. This spectrum measurement result shows that (i) two large absorption peaks were observed, that (ii) a value of an isomer shift, that is, a medium value between the two peaks, was approximately 1.25, and that (iii) a quadropole split, corresponding to a distance between the peaks, was approximately 2.8. The above absorption peaks coincide well with typical absorption peaks of $Fe^{2+}$. The spectrum of the cathode active material A1 showed, other than the peaks attributed to $Fe^{2+}$, peaks attributed to $Fe^{3+}$, the peaks having an isomer shift value of approximately 0.5 and a quadropole split of approximately 0.6 to 1.0. These results showed that the cathode active material A1 was made up of $Fe^{2+}$ and $Fe^{3+}$. An area ratio between $Fe^{2+}$ and $Fe^{3+}$ in the above spectrum showed that $Fe^{2+}:Fe^{3+}=95:5$.

Figure 9:
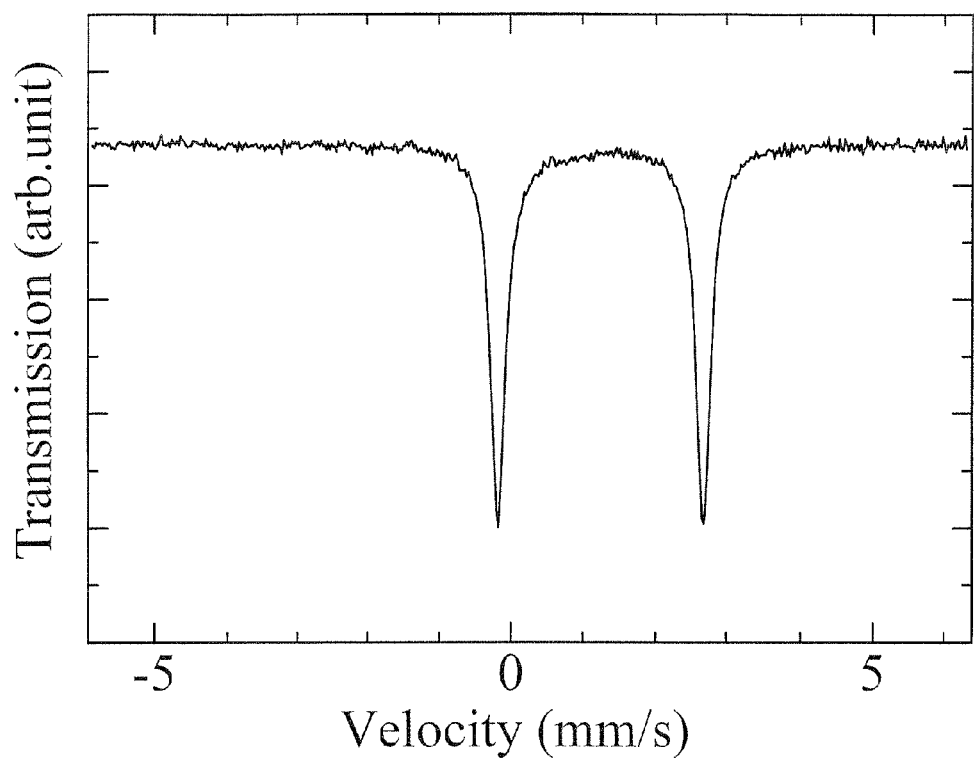
FIG. 9 is a graph illustrating an absorption spectrum measured by Mössbauer spectrometry of the cathode active material prepared in Example 3.

FIG. 9 shows an absorption spectrum obtained by a Mössbauer spectrometry for the cathode active material A2. This spectrometry result shows that (i) two large absorption peaks were observed, and as a result of fitting the peaks by double Lorentzian, that (ii) a value of an isomer shift, that is, a medium value between the two peaks, was approximately 1.25, and that (iii) a quadropole split, corresponding to a distance between the peaks, was approximately 2.8. The above absorption peaks coincide well with typical absorption peaks of $Fe^{2+}$. This showed that the cathode active material A2 was made up of $Fe^{2+}$. It should be noted that no peak attributed to $Fe^{3+}$ was observed, unlike in the cathode active material A1.

A measurement similar to the above was performed on each of the other cathode active materials A3 to A6, with a result similar to the above. This confirmed that the iron in each of the cathode active materials A2 to A6 had a valence of $2^+$.

(IV) Evaluation of Battery (IV-I) Capacity Ratio

Put into a 50-ml beaker a 30 ml electrolyte. The electrolyte was mixed 50% by volume of diethyl carbonate with 50% by volume of ethylene carbonate. 1 mol/L of $LiPF_6$ was dissolved in the electrolyte. With use of (i) the cathode electrode prepared in each of the Examples and the Comparative Example and (ii) metal lithium as an anodic active material serving as a counter electrode, a battery was prepared.

Each of the batteries thus prepared was first charged in an environment of 25° C. The charging current was 0.1 mA, and the charging was finished at a point in time where the battery reached a potential of 4V. After the charging was finished, the battery was discharged at 0.1 mA, and the discharging was finished at a point in time where the battery reached a potential of 2.0 V, with the result that the actually measured capacity of the battery was obtained. These results are shown in Table 3.

TABLE 3

| | Cathode active material | Theoretical capacity (mAh/g) | Actually measured capacity (mAh/g) | Capacity ratio (%) |
| --- | --- | --- | --- | --- |
| Example 2 | A1 | 121.7 | 110.4 | 90.6% |
| Example 3 | A2 | 140.5 | 128.4 | 91.4% |
| Example 4 | A3 | 145.3 | 130.3 | 89.7% |
| Example 5 | A4 | 150.1 | 127.9 | 85.2% |
| Example 6 | A5 | 156.0 | 138.0 | 88.5% |
| Example 7 | A6 | 159.9 | 140.3 | 87.7% |
| Comparative Example 1 | B1 | 169.9 | 147.5 | 86.8% |

(IV-II) Rate of Change in Volume

Furthermore, each battery prepared in "(IV-I) Capacity Ratio" was charged at a constant current of 0.1 mA until 4 V so that lithium was desorbed. After that, the lattice constant after lithium desorption was calculated by taking out the electrode and performing powder X-ray diffractometry on the electrode.

Table 4 shows lattice constants before charging. Table 5 shows lattice constants after charging. Table 6 shows rates of change in volume.

TABLE 4

| | Cathode active material | Lattice constant | | | Lattice volume (angstrom$^3$) |
| --- | --- | --- | --- | --- | --- |
| | | a axis (angstrom) | b axis (angstrom) | c axis (angstrom) | |
| Example 2 | A1 | 10.413 | 6.031 | 4.750 | 298.3 |
| Example 3 | A2 | 10.366 | 6.022 | 4.715 | 294.3 |
| Example 4 | A3 | 10.355 | 6.020 | 4.712 | 293.7 |
| Example 5 | A4 | 10.343 | 6.010 | 4.706 | 292.5 |
| Example 6 | A5 | 10.335 | 6.005 | 4.701 | 291.8 |
| Example 7 | A6 | 10.332 | 6.005 | 4.699 | 291.6 |
| Comparative Example 1 | B1 | 10.328 | 6.007 | 4.696 | 291.3 |

TABLE 5

| | Cathode active material | Lattice constant | | | Lattice volume (angstrom$^3$) |
| --- | --- | --- | --- | --- | --- |
| | | a axis (angstrom) | b axis (angstrom) | c axis (angstrom) | |
| Example 2 | A1 | 10.190 | 6.015 | 4.877 | 298.9 |
| Example 3 | A2 | 10.077 | 5.934 | 4.819 | 288.2 |
| Example 4 | A3 | 9.997 | 5.884 | 4.808 | 282.8 |
| Example 5 | A4 | 9.972 | 5.862 | 4.796 | 280.4 |
| Example 6 | A5 | 9.948 | 5.852 | 4.792 | 279.0 |
| Example 7 | A6 | 9.912 | 5.840 | 4.790 | 277.3 |

TABLE 5-continued

| Cathode active material | Lattice constant | | | Lattice volume (angstrom$^3$) |
|---|---|---|---|---|
| | a axis (angstrom) | b axis (angstrom) | c axis (angstrom) | |
| Comparative Example 1 | 9.830 | 5.802 | 4.785 | 272.9 |

TABLE 6

| | Cathode active material | Rate of change in volume (%) |
|---|---|---|
| Example 2 | A1 | −0.2 |
| Example 3 | A2 | 2.1 |
| Example 4 | A3 | 3.7 |
| Example 5 | A4 | 4.2 |
| Example 6 | A5 | 4.4 |
| Example 7 | A6 | 4.9 |
| Comparative Example 1 | B1 | 6.3 |

(IV-III) Evaluation of Capacity Retention Rate
<Preparation of Battery>

Used as an anodic active material were natural graphite powder and lithium titanate ($Li_4Ti_5O_{12}$). The anodic active material was mixed with approximately 10% by weight of polyvinylidene fluoride resin powder serving as a binding agent. Further, in the case where lithium titanate was used as an anodic active material, 10% by weight of acetylene black was mixed as a conductive agent. This mixture was dissolved in N-methyl-2-pyrrolidone to form slurry, and the slurry was applied onto both surfaces of a 20-μm-thick copper foil. The applied slurry was dried and then pressed to provide an anode.

The cathode prepared in each of the Examples and the Comparative Example and the above anode were each cut out in a size of 30 mm×30 mm. As a current introducing terminal for a battery, an aluminum tab having a width of 3 mm and a length of 50 mm was welded to the cathode, whereas a copper tab having a width of 3 mm and a length of 50 mm was welded to the anode. Thus prepared were a cathode electrode and an anode electrode.

A separator made of porous polyethylene was placed between the cathode electrode and the anode electrode. The layered product thus prepared was placed between laminate films including two metal foils to each of which a thermoplastic resin was attached. The metal foils were thermally welded to each other along the periphery to be sealed, which provided the battery with an armor. This laminate had an opening for injecting an electrolyte.

In the laminate, 50% by volume of ethylene carbonate, in which 1 mol/L of $LiPF_6$ was dissolved, and 50% by volume of diethyl carbonate were impregnated as an electrolyte.

After the electrolyte was injected in the battery, the opening of the battery container was sealed, to complete the preparation of a secondary battery.

Figure 10:
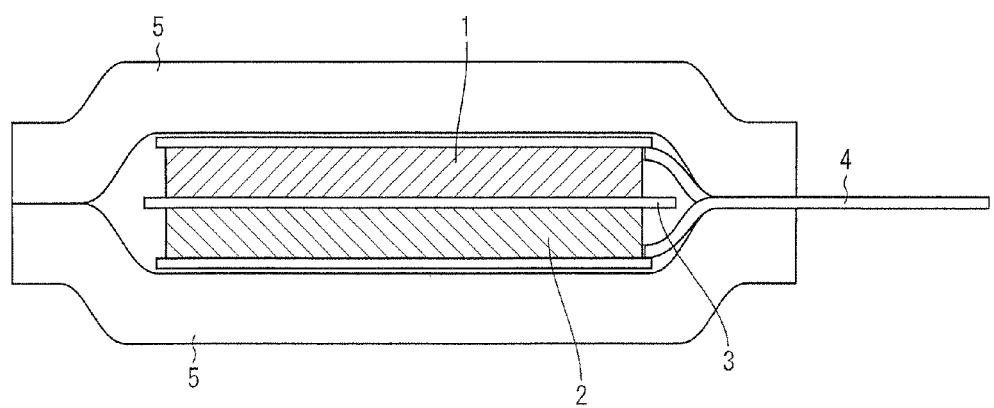
FIG. 10 is a cross-sectional view schematically illustrating a configuration of a battery used for evaluation of a capacity retention rate in Examples.

FIG. 10 is a cross-sectional view illustrating the battery prepared as above. FIG. 10 illustrates a cathode electrode 1, an anode electrode 2, a separator 3, cathode and anode tabs 4, and a laminate 5.

<Evaluation of Capacity Retention Rate>

Each of the batteries thus prepared was first charged in an environment of 25° C. The charging current was 0.2 mA, and the charging was finished at a point in time where the battery reached a potential of 4V. After the charging was finished, the battery was discharged at 0.2 mA, and the discharging was finished at a point in time where the battery reached a potential of 2.0 V, with the result that the initial capacity of the battery was obtained. Further, the battery was repeatedly charged and discharged at a current of 0.2 mA. A discharging capacity of the battery at a hundredth cycle was then measured, and a capacity retention rate was calculated according to the following formula:

Capacity retention rate=discharging capacity at hundredth cycle/initial discharging capacity.

Table 7 shows the results for the case where the anode is made of carbon. Table 8 shows the results for the case where the anode is made of lithium titanate.

TABLE 7

| | Cathode active material | Initial discharging capacity (mAh/g) | Discharging capacity at hundredth cycle (mAh/g) | Capacity retention rate (%) |
|---|---|---|---|---|
| Example 2 | A1 | 102.1 | 100.9 | 98.8 |
| Example 3 | A2 | 118.9 | 117.8 | 99.1 |
| Example 4 | A3 | 118.6 | 115.6 | 97.5 |
| Example 5 | A4 | 122.1 | 120.9 | 99.0 |
| Example 6 | A5 | 128.4 | 123.5 | 96.2 |
| Example 7 | A6 | 131.5 | 125.8 | 95.7 |
| Comparative Example 1 | B1 | 136.4 | 110.5 | 81.0 |

TABLE 8

| | Cathode active material | Initial discharging capacity (mAh/g) | Discharging capacity at hundredth cycle (mAh/g) | Capacity retention rate (%) |
|---|---|---|---|---|
| Example 2 | A1 | 108.0 | 105.9 | 98.0 |
| Example 3 | A2 | 125.2 | 123.3 | 98.4 |
| Example 4 | A3 | 126.1 | 123.5 | 97.9 |
| Example 5 | A4 | 127.8 | 125.7 | 98.3 |
| Example 6 | A5 | 136.5 | 129.8 | 95.1 |
| Example 7 | A6 | 138.3 | 130.8 | 94.6 |
| Comparative Example 1 | B1 | 145.6 | 130.8 | 89.8 |

Tables 7 and 8 show the following: The batteries including the respective cathode active materials A 1 to A6 are superior in capacity itself and capacity retention rate to the battery including the cathode active material B1 of Comparative Example 1. Among the batteries including the respective cathode active materials A1 to A6, the batteries including the respective cathode active materials A2 to A6, in each of which every Fe has a valence of +2, are superior in property to the battery including the cathode active material A1, which includes Fe atoms having a valence of 3.

Further, the batteries including the respective cathode active materials A1 to A3 each have a capacity retention rate of approximately 99%, and are thus extremely excellent in cycling characteristics.

The batteries including the respective cathode active materials A4 to A6 are, on the other hand, lower in capacity retention rate than the batteries including the respective cathode active materials A 1 to A3, but are better in cycling characteristics than the cathode active material of Comparative Example 1 and also larger in capacity itself than the batteries including the respective cathode active materials A 1 to A3. Thus, an application that requires a long life preferably involves as a cathode active material a composition, such as the cathode active materials A1 to A3, in which the amount of substitution is 0.1≤x≤0.5, whereas an application that requires a long life and a higher capacity preferably involves as a cathode active material composition, such as the cathode active materials A4 to A6, in which the amount of substitution is 0.05≤x≤0.1.

(IV-IV) Evaluation of Changes in Thickness During Charging and Discharging

Example 8

Ten grams of the cathode active material A1 obtained in Example 1 were weighed out, crushed in an agate mortar, and then mixed with approximately 10 percent by weight of a conductive agent, acetylene black (marketed as "Denka Black"; manufactured by Denki Kagaku Kogyo Kabushiki Kaisha), relative of the cathode active material and approximately 10 percent by weight of a binding agent, polyvinylidene fluoride resin powder, relative to the cathode active material.

This mixture was dissolved in a solvent such as N-methyl-2-pyrrolidone to form slurry, and the slurry was applied onto both surfaces of a 20-μm-thick aluminum foil by a doctor blade method so that the amount of application was approximately 20 mg/cm². This electrode was dried, and then oil-pressed so that its thickness was approximately 100 μm, including the thickness of the aluminum foil. Thus electrode was an electrode having an electrode size of 2 cm×2 cm.

After the electrode had been dried, a battery was prepared by using the electrode as a cathode, using Li metal as a counter electrode, and pouring 50 ml of an electrolyte into a 100-ml glass container. The electrolyte (manufactured by Kishida Chemical Co., Ltd.) used was obtained by dissolving $LiPF_6$ in a solvent so that the concentration was 1.4 mol/l, and the solvent used was obtained by mixing ethylene carbonate and diethyl carbonate with a volume ratio of 7:3.

As a result of charging of the resultant battery at 0.1 mA, a charging capacity of 140 mAh/g was obtained. As a result of measurement of the thickness of the cathode taken out after completion of charging, the cathode had a thickness of 97 μm, while it had had a thickness of 101 μm before the charging.

Comparative Example 2

An electrode was prepared through the same procedure as in Example 8 except that the cathode active material B1 prepared in Comparative Example 1 was used instead of the cathode active material A1. A battery prepared by using the electrode as cathode was charged and discharged, and the thickness of the cathode was measured. As a result, the cathode had a thickness of 93 μm, while it had had a thickness of 102 μm before the charging.

Comparison between Example 8 and Comparative Example 2 shows that a cathode according to the present invention has a smaller amount of change in thickness during charging and discharging than a conventional cathode.

Example 9

Flat-Plate Laminate Battery

A lithium source $LiCH_3COO$, an iron source $Fe(NO_3)_3 \cdot 9H_2O$, a zirconium source $ZrCl_4$, a phosphate source $H_3PO_4$ (85%), and a silicon source $Si(OC_2H_5)_4$ were used as starting materials. These starting materials were measured out so that the molar ratio is Li:Fe:Zr:P:Si=1:0.75:0.25:0.5:0.5, with the lithium source $LiCH_3COO$ used in an amount of 131.96 g.

These starting materials were dissolved in 3000 ml of $C_2H_5OH$ and stirred by a stirring motor for 48 hours at room temperature. After that, the solvent was removed at 40° C. in a constant-temperature bath, with the result that a brownish-red powder was obtained.

Two hundred grams of the resultant brownish-red powder were weighed out, crushed in steps of 10 g in an automatic mortar, and then mixed with approximately 10 percent by weight of a conductive agent, acetylene black (marketed as "Denka Black"; manufactured by Denki Kagaku Kogyo Kabushiki Kaisha), relative of the cathode active material and approximately 10 percent by weight of binding agent, polyvinylidene fluoride resin powder, relative to the cathode active material.

This mixture was dissolved in a solvent such as N-methyl-2-pyrrolidone to form slurry, and the slurry was applied onto both surfaces of a 20-μm-thick aluminum foil by a doctor blade method. After the slurry had been applied onto one surface, the same slurry was applied onto the other surface, whereby an electrode as formed on both surfaces of the metal foil. It should be noted that the slurry was applied so that the amount of application per surface was approximately 15 mg/cm².

After the electrode had been dried, a cathode electrode was prepared by pressing the electrode by passing it through a space between two metal rollers placed at a distance of approximately 130 μm, in order that its thickness was approximately 150 μm, including the thickness of the aluminum foil.

Next, approximately 500 g of natural graphite powder having an average particle diameter of approximately 5 μm were weight out as an anodic active material, and this anodic active material was mixed with approximately 10 percent by weight of a binding agent, polyvinylidene fluoride resin powder, relative to the anodic active material.

This mixture was dissolved in a solvent such as N-methyl-2-pyrrolidone to form slurry, and the slurry was applied onto both surfaces of a 12-μm-thick copper foil by a doctor blade method. After the slurry had been applied onto one surface, the same slurry was applied onto the other surface, whereby an electrode as formed on both surfaces of the metal foil. It should be noted that the amount of application per surface was approximately 7 mg/cm².

After the electrode had been dried, an anodic electrode was prepared by pressing the electrode by passing it through a space between two metal rollers placed at a distance of approximately 120 μm, in order that its thickness was approximately 140 μm, including the thickness of the copper foil.

The cathode electrode thus obtained was cut into ten cathode electrodes each having a width of 10 cm and a height of 15 cm. Similarly, the anodic electrode was cut into eleven anodic electrodes each having a width of 10.6 cm and a height of 15.6 cm. It should be noted that the cathodes and the anodes had their shorter sides provided with unpainted parts each having a width of 10 mm and a length of 25 mm, and these unpainted parts served as collector tabs.

Figure 11:
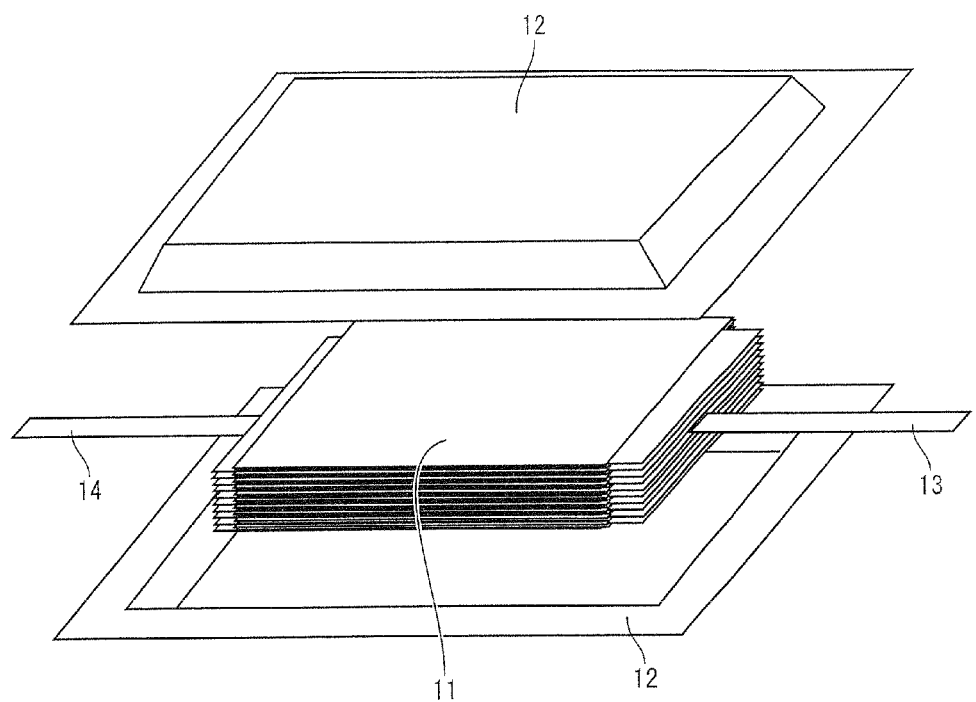
FIG. 11 is a perspective view schematically illustrating a configuration of a flat-plate laminate battery prepared in Example 9.

As separators, twenty polypropylene porous films each having a thickness of 25 μm, a width of 11 cm, and a height of 16 cm were used. Such a layered product 11 as shown in FIG. 11 was obtained layering the cathodes, the anodes, and the separators in such a way that the separators are disposed on both surfaces of the cathodes so that the anodes and the cathodes do not have direct contact with each other; and fixing them with an adhesive tape made of Kapton resin. Welded ultrasonically to each of the cathode tabs of the layered product 11 was a cathode collector lead 13, made of aluminum, which had a width of 10 mm, a length of 30 mm, and a thickness of 100 μm. Similarly welded ultrasonically to each of the anode tabs was an anode collector lead 14, made of nickel, which had a width of 10 mm, a length of 30 mm, and a thickness of 100 μm.

The layered product 11 thus prepared was placed between two aluminum laminates 12, three of whose sides were heat-sealed. In this state, the layered product 11 was dehydrated by heating it for twelve hours at a temperature of approximately 80° C. in a chamber decompressed by a rotary pump.

The layered product 11 thus dried was placed in a dry box in an Ar atmosphere, and a flat-plate laminate battery was prepared by injecting approximately 50 cc of an electrolyte (manufactured by Kishida Chemical Co., Ltd.) and sealing the opening under reduced pressure. The electrolyte used was obtained by dissolving $LiPF_6$ in a solvent so that the concentration was 1.4 mol/l, and the solvent used was obtained by mixing ethylene carbonate and diethyl carbonate with a volume ratio of 7:3.

The prepared battery had a thickness of 4.1 mm. A current of 100 mA was applied to this battery, and the charging was finished at a point in time where the battery reached a voltage of 3.9 V. After the charging, the battery had a measured thickness of 4.2 mm. This shows that there was almost no change in thickness during the charging.

Comparative Example 3

A flat-plate laminate battery was prepared through exactly the same procedure as in Example 8 except that a lithium source $LiCH_3COO$, an iron source $Fe(NO_3)_3 \cdot 9H_2O$, and a phosphate source $H_3PO_4$ (85%) were used as starting materials and that these starting materials were measured out so that the molar ratio is Li:Fe:P=1:1:1, with the lithium source $LiCH_3COO$ used in an amount of 131.96 g.

The prepared battery had a thickness of 4.1 mm. A current of 100 mA was applied to this battery, and the charging was finished at a point in time where the battery reached a voltage of 3.9 V. After the charging, the battery had a measured thickness of 4.7 mm.

The results of Example 9 and Comparative Example 3 show that a battery in which a cathode according to the present invention is used changes less in thickness than a battery in which a conventional cathode is used.

Example 10

Layered Cuboidal Battery

A lithium source $LiCH_3COO$, an iron source $Fe(NO_3)_3 \cdot 9H_2O$, a zirconium source $ZrCl_4$, a phosphate source $H_3PO_4$ (85%), and a silicon source $Si(OC_2H_5)_4$ were used as starting materials. These starting materials were measured out so that the molar ratio is Li:Fe:Zr:P:Si=1:0.75:0.25:0.5:0.5, with the lithium source $LiCH_3COO$ used in an amount of 1319.6 g. These starting materials were dissolved in 30 L of $C_2H_5OH$ and stirred by a stirring motor for 48 hours at room temperature. After that, the solvent was removed at 40° C. in a constant-temperature bath, with the result that a brownish-red powder was obtained.

One thousand grams of the resultant brownish-red powder were weighed out, crushed in steps of 10 g in an automatic mortar, and then mixed with approximately 10 percent by weight of a conductive agent, acetylene black (marketed as "Denka Black"; manufactured by Denki Kagaku Kogyo Kabushiki Kaisha), relative of the cathode active material and approximately 10 percent by weight of a binding agent, polyvinylidene fluoride resin powder, relative to the cathode active material.

This mixture was dissolved in a solvent such as N-methyl-2-pyrrolidone to form slurry, and the slurry was applied onto both surfaces of a 20-μm-thick aluminum foil by a doctor blade method. After the slurry had been applied onto one surface, the same slurry was applied onto the other surface, whereby an electrode as formed on both surfaces of the metal foil. It should be noted that that the amount of application per surface was approximately 15 mg/cm².

After the electrode had been dried, a cathode electrode was prepared by pressing the electrode by passing it through a space between two metal rollers placed at a distance of approximately 130 μm, in order that its thickness was approximately 150 μm, including the thickness of the aluminum foil.

Next, approximately 500 g of natural graphite powder having an average particle diameter of approximately 5 μm were weight out as an anodic active material, and this anodic active material was mixed with approximately 10 percent by weight of a binding agent, polyvinylidene fluoride resin powder, relative to the anodic active material.

This mixture was dissolved in a solvent such as N-methyl-2-pyrrolidone to form slurry, and the slurry was applied onto both surfaces of a 12-μm-thick copper foil by a doctor blade method. After the slurry had been applied onto one surface, the same slurry was applied onto the other surface, whereby an electrode as formed on both surfaces of the metal foil. It should be noted that the amount of application per surface was approximately 7 mg/cm².

After the electrode had been dried, an anodic electrode was prepared by pressing the electrode by passing it through a space between two metal rollers placed at a distance of approximately 120 μm, in order that its thickness was approximately 140 μm, including the thickness of the copper foil.

The cathode electrode thus obtained was cut into ten cathode electrodes each having a width of 10 cm and a height of 15 cm. Similarly, the anodic electrode was cut into eleven anodic electrodes each having a width of 10.6 cm and a height of 15.6 cm. It should be noted that the cathodes and the anodes had their shorter sides provided with unpainted parts each having a width of 10 mm and a length of 25 mm, and these unpainted parts served as collector tabs.

As separators, twenty polypropylene porous films each processed to have a thickness of 25 μm, a width of 11 cm, and a height of 16 cm were used.

Figure 12:
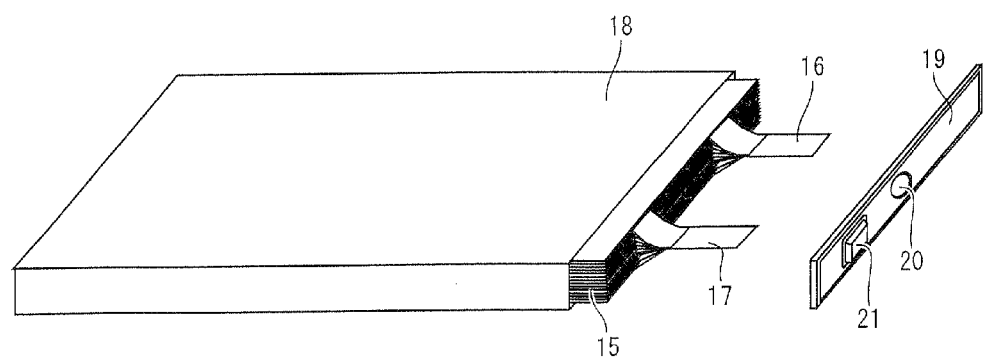
FIG. 12 is a perspective view schematically illustrating a configuration of a layered cuboidal battery prepared in Example 10.

Such a layered product 15 as shown in FIG. 12 was obtained by: layering the cathodes, the anodes, and the separators in such a way that the separators are disposed on both surfaces of the cathodes so that the anodes and the cathodes do not have direct contact with each other; and fixing them with an adhesive tape made of Kapton resin.

Welded ultrasonically to each of the cathode tabs of the layered product 15 was a cathode collector lead 16, made of aluminum, which had a width of 10 mm, a length of mm, and a thickness of 100 μm. Similarly welded ultrasonically to each of the anode tabs was an anode collector lead 17, made of nickel, which had a width of 10 mm, a length of 30 mm, and a thickness of 100 μm.

The layered product 15 was dehydrated by heating it for twelve hours at a temperature of approximately 80° C. in a chamber decompressed by a rotary pump.

The layered product 15 thus dried was inserted into a battery can 18 in a dry box in an Ar atmosphere, and the collector leads 16 and 17 of the layered product 15 were welded ultrasonically to the ends of collector terminals (cathode terminals, anode terminals 21) of a battery lid 19 provided with two piercing terminals and made of an aluminum metal plate. It should be noted that the battery can 18 used was a 1-mm-thick aluminum can shaped into cuboid with the dimensions 12 cm×18 cm×2 cm and provided with a safety valve 20.

Then, the battery lid 19 was fitted in the opening of the battery can 18, and the battery was sealed by laser-welding the joint.

A cuboidal battery was prepared by injecting approximately 300 cc of an electrolyte (manufactured by Kishida Chemical Co., Ltd.) through a hole of 1 mm diameter made in the battery lid 19 and then sealing the injection hole by laser welding. The electrolyte used was obtained by dissolving $LiPF_6$ in a solvent so that the concentration was 1.4 mol/l, and the solvent used was obtained by mixing ethylene carbonate and diethyl carbonate with a volume ratio of 7:3.

The prepared battery had a thickness of 20.0 mm in its central part. A current of 100 mA was applied to this battery, and the charging was finished at a point in time where the battery reached a voltage of 3.9 V. After the charging, the battery had a measured thickness of 20.0 mm in its central part. This shows that there was almost no change in thickness during the charging.

Comparative Example 4

A layered cuboidal battery was prepared through exactly the same procedure as in Example 10 except that a lithium source $LiCH_3COO$, an iron source $Fe(NO_3)_3 \cdot 9H_2O$, and a phosphate source $H_3PO_4$ (85%) were used as starting materials and that these starting materials were measured out so that the molar ratio is Li:Fe:P=1:1:1, with the lithium source $LiCH_3COO$ used in an amount of 131.96 g.

The prepared battery had a thickness of 20.0 mm in its central part. A current of 100 mA was applied to this battery, and the charging was finished at a point in time where the battery reached a voltage of 3.9 V. After the charging, the battery had a measured thickness of 21.5 mm in its central part.

The results of Example 10 and Comparative Example 4 show that a battery in which a cathode according to the present invention is used changes less in thickness than a battery in which a conventional cathode is used.

(IV-V) Evaluation of the Capacity Retention Rate of Wound Cylindrical Battery

Example 11

Wound Cylindrical Battery

A lithium source $LiCH_3COO$, an iron source $Fe(NO_3)_3 \cdot 9H_2O$, a zirconium source $ZrCl_4$, a phosphate source $H_3PO_4$ (85%), and a silicon source $Si(OC_2H_5)_4$ were used as starting materials. These starting materials were measured out so that the molar ratio is Li:Fe:Zr:P:Si=1:0.75:0.25:0.5:0.5, with the lithium source $LiCH_3COO$ used in an amount of 1319.6 g. These starting materials were dissolved in 30 L of $C_2H_5OH$ and stirred by a stirring motor for 48 hours at room temperature. After that, the solvent was removed at 40° C. in a constant-temperature bath, with the result that a brownish-red powder was obtained.

One thousand grams of the resultant brownish-red powder were weighed out, crushed in steps of 10 g in an automatic mortar, and then mixed with approximately 10 percent by weight of a conductive agent, acetylene black (marketed as "Denka Black"; manufactured by Denki Kagaku Kogyo Kabushiki Kaisha), relative of the cathode active material and approximately 10 percent by weight of a binding agent, polyvinylidene fluoride resin powder, relative to the cathode active material.

This mixture was dissolved in a solvent such as N-methyl-2-pyrrolidone to form slurry, and the slurry was applied onto both surfaces of a 20-μm-thick aluminum foil by a doctor blade method. After the slurry had been applied onto one surface, the same slurry was applied onto the other surface, whereby an electrode as formed on both surfaces of the metal foil. It should be noted that that the amount of application per surface was approximately 15 mg/cm².

After the electrode had been dried, a cathode electrode was prepared by pressing the electrode by passing it through a space between two metal rollers placed at a distance of approximately 130 μm, in order that its thickness was approximately 150 μm, including the thickness of the aluminum foil.

Next, approximately 500 g of natural graphite powder having an average particle diameter of approximately 5 μm were weight out as an anodic active material, and this anodic active material was mixed with approximately 10 percent by weight of a binding agent, polyvinylidene fluoride resin powder, relative to the anodic active material.

This mixture was dissolved in a solvent such as N-methyl-2-pyrrolidone to form slurry, and the slurry was applied onto both surfaces of a 12-μm-thick copper foil by a doctor blade method. After the slurry had been applied onto one surface, the same slurry was applied onto the other surface, whereby an electrode as formed on both surfaces of the metal foil. It should be noted that the amount of application per surface was approximately 7 mg/cm².

After the electrode had been dried, an anodic electrode was prepared by pressing the electrode by passing it through a space between two metal rollers placed at a distance of approximately 120 μm, in order that its thickness was approximately 140 μm, including the thickness of the copper foil.

The cathode electrode thus obtained was cut so as to have a width of 5 cm and a length of 150 cm. Similarly, the anodic electrode was cut so as to have a width of 5.2 cm and a height of 160 cm.

The cathodes and the anodes had their shorter sides provided with unpainted parts to which collector tabs were welded. Welded ultrasonically to each of the unpainted parts was a metal lead having a width of 4 mm, a thickness of 100 μm, and a length of 10 cm. Further, as those metal leads for the cathodes were made of aluminum, and those for the anodes were made of nickel.

Figure 13:
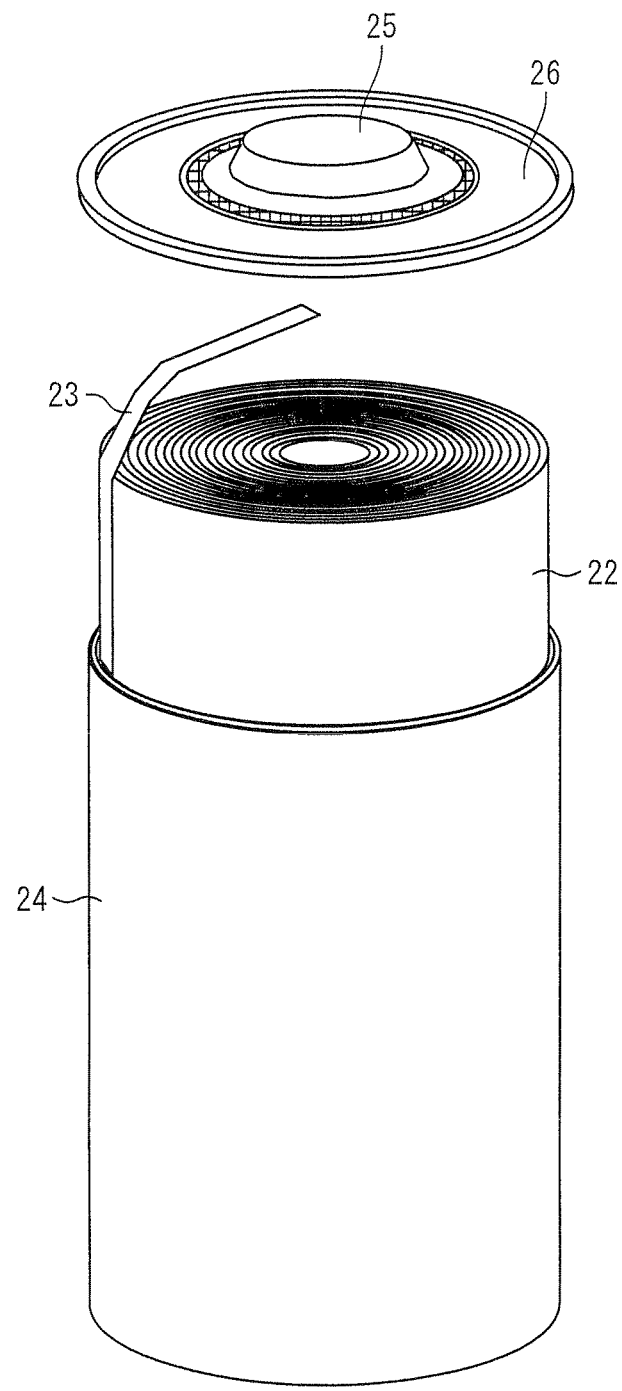
FIG. 13 is a perspective view schematically illustrating a configuration of a wound cylindrical battery prepared in Example 11.

As a separator, a 25-μm-thick polypropylene porous film processed to have a width of 6 cm and a length of 350 cm was used. The separator was folded in half so as to have a width of 6 cm and a length of 175 cm, and the cathode was sandwiched between the halves. Such a cylindrical wound product 22 as shown in FIG. 13 was obtained by putting the anode on top of the intermediate product and winding it around a polyethylene spindle having a diameter of 5 mm and a length of 6.5 cm. The final wound product 22 was bound tightly with a Kapton tape so as not to be unwound.

The wound product 22 thus prepared was dehydrated by heating it for twelve hours at a temperature of approximately 80° C. in a chamber decompressed by a rotary pump. It should be noted that after this operation, following operations were carried out in an argon dry box at a dew point of −40° C. or lower.

An aluminum pipe, having a diameter of 30 mm and a length of 70 mm, one end of which had been closed by welding an aluminum disc having a diameter of 30 cm was used as a battery can 24. It should be noted that a bottom lid was joined by laser welding.

The wound product 22 was inserted into the battery can 24 and, as shown in FIG. 13, a cathode collector lead 23 was spot-welded to a cathode terminal 25 of a battery lid 26, and an anode lead (not shown) was spot-welded to the bottom surface of the battery can 24. Then, the battery was sealed by laser-welding the battery lid 26 to the opening of the cylinder.

Then, a cylindrical battery was prepared by injecting approximately 5 cc of an electrolyte (manufactured by Kishida Chemical Co., Ltd.) through a hole of 1 mm diameter made in the battery lid 26 and then sealing the injection hole by laser welding. The electrolyte used was obtained by dissolving $LiPF_6$ in a solvent so that the concentration was 1.4 mol/l, and the solvent used was obtained by mixing ethylene carbonate and diethyl carbonate with a volume ratio of 7:3.

Five such batteries were prepared. A current of 100 mA was applied to each of the batteries, and the charging was finished at a point in time where the battery reached a voltage of 3.9V and, furthermore, the battery was discharged until 2.2V. This cycle was repeated a hundred times. Table 9 shows the result of an evaluation.

Comparative Example 5

A cylindrical battery was prepared through exactly the same procedure as in Example 11 except that a lithium source $LiCH_3COO$, an iron source $Fe(NO_3)_3 \cdot 9H_2O$, and a phosphate source $H_3PO_4$ (85%) were used as starting materials and that these starting materials were measured out so that the molar ratio is Li:Fe:P=1:1:1, with the lithium source $LiCH_3COO$ used in an amount of 131.96 g.

Table 9 shows the result of a charge-discharge evaluation carried out through exactly the same procedure as in Example 11. As shown in Table 9, it was confirmed that the battery of the present invention has a higher capacity retention ratio and a longer life than the comparative example.

TABLE 9

| | n | Initial discharging capacity (mAh/g) | Discharging capacity at hundredth cycle (mAh/g) | Capacity retention rate (%) |
|---|---|---|---|---|
| Example 11 | 1 | 2.61 | 2.58 | 98.7 |
| | 2 | 2.62 | 2.60 | 99.2 |
| | 3 | 2.60 | 2.59 | 99.5 |
| | 4 | 2.66 | 2.66 | 100 |
| | 5 | 2.64 | 2.61 | 98.9 |
| Comparative Example 5 | 1 | 3.02 | 2.88 | 95.2 |
| | 2 | 3.11 | 3.00 | 96.5 |
| | 3 | 3.03 | 2.94 | 97.2 |
| | 4 | 3.04 | 2.83 | 93.2 |
| | 5 | 3.00 | 2.83 | 94.5 |

INDUSTRIAL APPLICABILITY

A cathode active material of the present invention not only excels in terms of safety and cost but also can provide a long-life battery, and as such, can be suitably used as a cathode active material in a nonaqueous secondary battery such as a lithium ion battery.

REFERENCE SIGNS LIST

11, 15 layered product
12 aluminum laminate
13, 16, 23 cathode collector lead
14, 17 anode collector lead
18, 24 battery can
20 safety valve
21 anode terminal
22 wound product
25 cathode terminal

The invention claimed is:

1. A cathode active material having a composition represented by General Formula (1) below, $$LiFe_{1-x}M_xP_{1-y}Si_yO_4 \quad (1),$$

where:
an average valence of Fe is +2 or more;
M is an element having a valence of +2 or more and is at least one type of element selected from a group consisting of Zr, Y, and Al;
the valence of M is different from the average valence of Fe;
$0<x\leq0.5$; and $0<y<1$, wherein:
a rate of chane in volume of a unit cell in $Li_xFe_{1-x}M_xP_{1-y}Si_yO_4$ is 4% or less with resect to a volume of a unit cell in General Formula (1).

2. The cathode active material according to claim 1, wherein:

$$y=x\times(\{\text{valence of }M\}-2)+(1-x)\times(\{\text{average valence of }Fe\}-2).$$

3. The cathode active material according to claim 1, wherein: the valence of M is +4.

4. The cathode active material according to claim 3, wherein: M in General Formula (1) is Zr; and $0.15\leq x\leq0.5$.

5. The cathode active material according to claim 3, wherein: M in General Formula (1) is Zr; and $0.25\leq x\leq0.5$.

6. The cathode active material according to claim 1, wherein: the valence of M in General Formula (1) is +3.

7. The cathode active material according to claim 6, wherein: M in General Formula (1) is Y; and $0.2\leq x\leq0.5$.

8. The cathode active material according to claim 6, wherein: M in General Formula (1) is Al; and $0.35\leq x\leq0.5$.

9. The cathode active material according to claim 1, wherein: the average valence of Fe in General Formula (1) is +2.

10. The cathode active material according to claim 9, wherein: M in General Formula (1) is Zr; and $0.05\leq x\leq0.15$.

11. A cathode comprising:
the cathode active material according to claim 1;
a conductive material; and
a binder.

12. A nonaqueous secondary battery, comprising:
the cathode according to claim 11;
an anode;
an electrolyte; and
a separator.

13. The nonaqueous secondary battery according to claim 12, when the battery reached a voltage of not less than 3.9 V, the cathode active material has a composition represented by General Formula (2) below, $$Li_xFe_{1-x}M_xP_{1-y}Si_yO_4 \quad (2).$$

14. The nonaqueous secondary battery according to claim 13, wherein: the nonaqueous secondary battery is one of a laminate battery, a layered cuboidal battery, a wound cuboidal battery, and a wound cylindrical battery.

15. The nonaqueous secondary battery according to claim 13,
wherein: the nonaqueous secondary battery has an armor of the battery in the case where the armor is made of a metal.

16. A module comprising:
a combination of a plurality of the nonaqueous secondary battery according to claim 12.

17. A power storage system comprising:
the nonaqueous secondary battery according to claim 12.

18. The power storage system according to claim 17,
wherein: the power storage system is one of a power storage system for a solar battery, a storage system for late-night power, a power storage system for wind power generation, a power storage system for geothermal power generation, and a power storage system for wave activated power generation.

* * * * *